United States Patent [19]

Presley et al.

[11] 4,430,846

[45] Feb. 14, 1984

[54] ELECTROHYDRAULIC DRIVE AND CONTROL

[75] Inventors: Glen T. Presley, Angola, Ind.; Lloyd L. Lautzenhiser, Ridgecrest, Calif.

[73] Assignee: Electro-Hydraulic Controls, Inc., Angola, Ind.

[21] Appl. No.: 339,483

[22] Filed: Jan. 15, 1982

[51] Int. Cl.³ .............................................. A01D 69/00
[52] U.S. Cl. .............................. 56/10.2; 56/DIG. 15; 137/117; 251/129
[58] Field of Search ....... 56/10.2, DIG. 15, DIG. 11; 137/117; 180/179; 251/205, 129; 318/318, 326, 327, 328

[56] References Cited

U.S. PATENT DOCUMENTS

| | | | |
|---|---|---|---|
| 2,445,544 | 7/1948 | Trautman | 137/117 |
| 3,381,936 | 5/1968 | Allen | 137/117 |
| 3,589,109 | 6/1971 | Payne | 56/10.2 |
| 3,630,304 | 12/1971 | Sahinkaya | 180/179 |
| 3,740,633 | 6/1973 | Buttafava | 318/328 |
| 3,785,392 | 1/1974 | Baker | 137/117 |
| 3,870,941 | 3/1975 | Ikenge et al. | 318/326 |
| 3,965,921 | 6/1976 | Thurston | 137/117 |
| 3,999,359 | 12/1976 | Jordan et al. | 56/10.7 |
| 4,121,610 | 10/1978 | Harms et al. | 137/117 |
| 4,188,772 | 2/1980 | Jordan et al. | 56/102 |
| 4,326,153 | 4/1982 | Contri | 318/327 |
| 4,332,127 | 6/1982 | Staiert et al. | 56/10.2 |
| 4,335,568 | 6/1982 | Langenstein | 56/DIG. 15 |
| 4,337,839 | 7/1982 | Taplin | 180/179 |
| 4,348,855 | 9/1982 | De Pauw et al. | 56/10.2 |

*Primary Examiner*—Gene Mancene
*Assistant Examiner*—David L. Tarnoff
*Attorney, Agent, or Firm*—Wendell E. Miller

[57] ABSTRACT

The present invention provides an electrohydraulic control, which includes both an electrohydraulic valve (36) and an electronic control (382). The electronic control includes an offsetting circuit (622) and is effective to produce an effective driving voltage, for an electrical force-motor (52) of the electrohydraulic valve, that is pulse-width-modulated and that is greater than a fixed proportionality to an input signal (410) by a manually adjustable offset voltage. The offset voltage may be adjusted to produce a null force that exactly balances a spring (129) which presses the valve spool (54) to an overlapped position; so that fluid flow is proportional to an input signal irrespective of the initial load of the spring. When used in conjunction with a ground-speed sensor (380) to control the reel drive on an agricultural harvesting machine, the offset voltage is set higher than a null voltage; so that the resultant rate of fluid flow produces a tangential velocity of the reel that is always greater than the ground speed of the machine.

19 Claims, 29 Drawing Figures

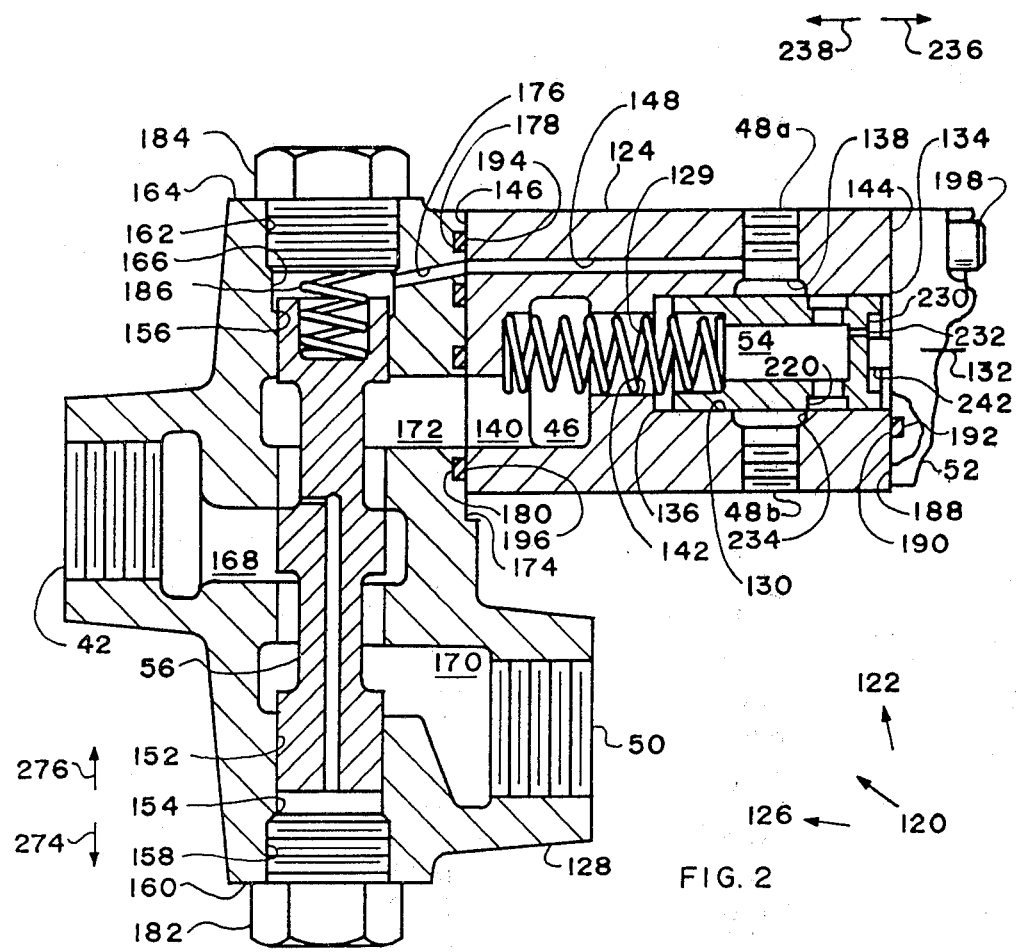
FIG. 2
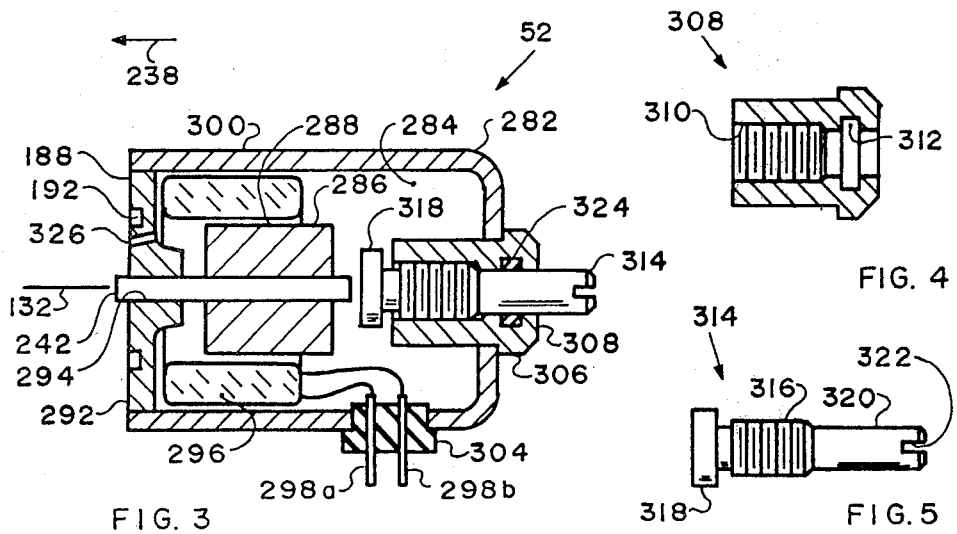
FIG. 3
FIG. 4
FIG. 5

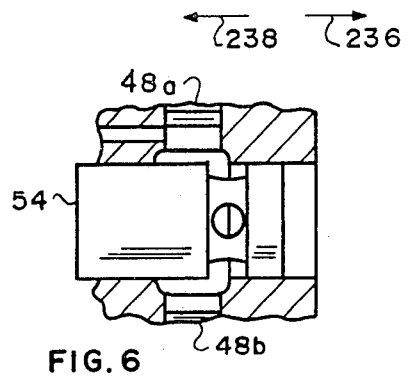
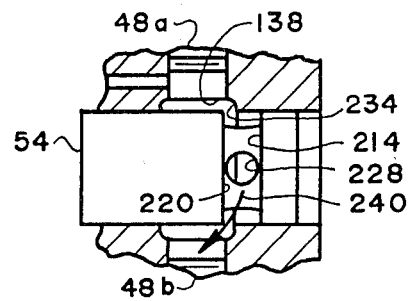
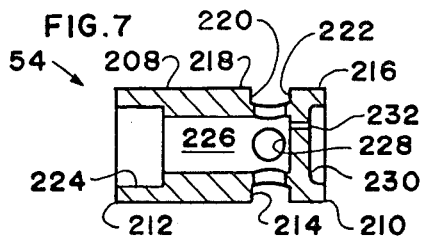
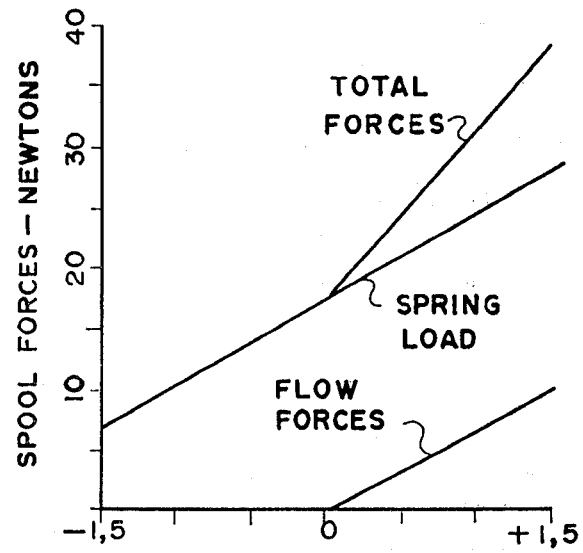
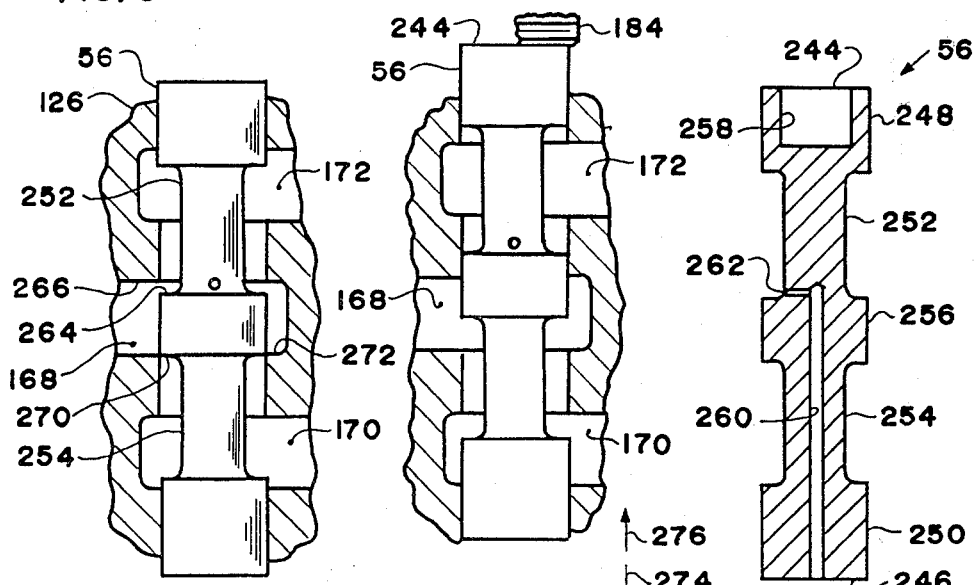

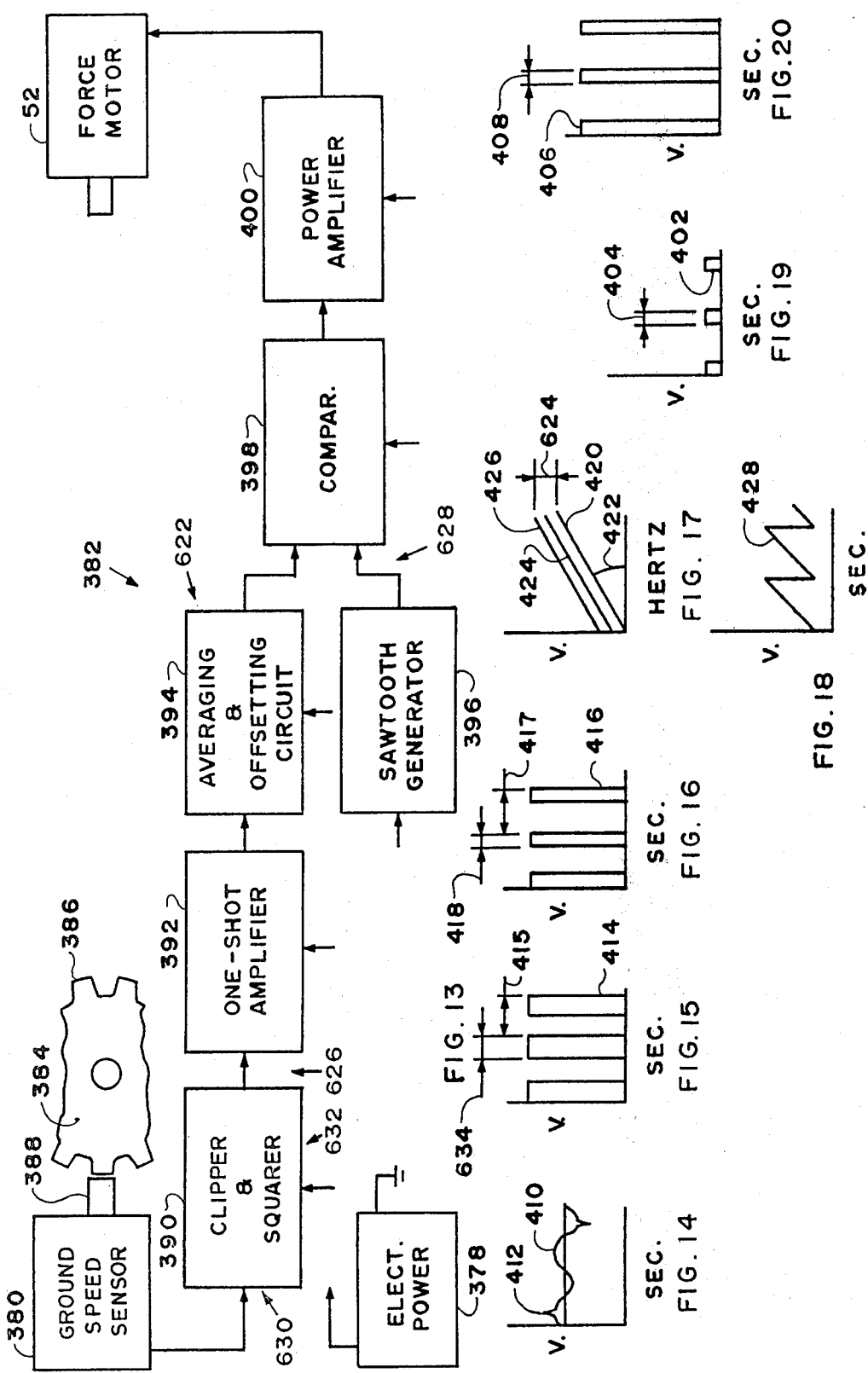

ELECTROHYDRAULIC DRIVE AND CONTROL

The present invention relates generally to electrohydraulic drives and controls for electrohydraulic drives, and more particularly to agricultural harvesting machines, such as combines and swathers, and an electrohydraulic control for driving a crop-transporting mechanism such as a reel or pickup mechanism.

BACKGROUND ART

Starting in 1834 with the invention of the reaper, agricultural harvesting machines of the mobile type have used a reel to transport stalks of grain backward onto a platform as they are cut by the sickle bar.

In addition to reels, other types of crop-transporting mechanisms that have been used on agricultural harvesting machines include conveyor belts, augers, and pickup mechanisms.

In the era of horsedrawn harvesting machines, some, if not all, of the rotating mechanisms of the harvesting machines were driven by chains from a lugged wheel that supported the harvesting machine. Reels for reapers, binders, and combines were driven at a fixed driving ratio to the lugged wheel; and the fixed ratio was chosen to give a tangential speed to the periphery of the reel bats that was greater than the ground speed of the harvesting machine.

Because the harvesting speed of horsedrawn harvesting machines varied over a very small range, it was possible to select a driving ratio that would provide sufficient differential velocity between the reel and the ground speed, at minimum ground speed, to effectively convey the cut grain from the cutter bar back onto the conveyor belt without hitting the grain with a velocity that would cause shattering of the grain, at maximum ground speed.

With the advent of tractor-propelled harvesting machines, and the later advent of self-propelled harvesting machines, the range of harvesting speeds was increased greatly. This increase in the range of harvesting speeds brought forth the necessity for a means of changing the ratio of reel velocity to ground speed.

The first improvement was the use of dual drive sprockets having a different number of teeth. A change in the drive ratio between the lugged wheel and the reel was made by changing the drive chain from one sprocket to the other. Later, a variable-speed belt drive was used, with the effective pitch diameter of the pulley or sheave being changed by a hydraulic cylinder. Still later, the mechanical drive to the reel was replaced by a hydraulic motor; and the reel speed was controlled by a manually adjusted valve.

The dual sprocket design was highly unsatisfactory because the varying conditions in some fields require large and frequent changes in ground speeds for efficient harvesting; and it was necessary to stop the harvesting machine in order to change the drive chain from one sprocket to the other.

Both the hydraulically-controlled variable-speed belt drive and the hydraulic motor drive alleviated the necessity of stopping the vehicle to change the reel drive ratio; but both required constant attention from the operator of the harvesting machine to prevent the reel speed from being too slow or too fast.

The present invention alleviates all of the aforementioned problems by electronically sensing ground speed and then driving the reel at a velocity that is greater than the ground speed by a predetermined velocity.

The present invention provides improvements over prior art in three distinct areas: in the drive and control of crop-transporting mechanisms of agricultural harvesting machines, as described above, in electrohydraulic valves, and in electronic controls for electrohydraulic valves.

With regard to electrohydraulic valves, proportional-flow electrohydraulic valves have commonly used such devices as nozzles and flapper valves, with the flapper valve being controlled by an electrical force-motor, to control fluid pressure applied to opposite ends of a valve spool and thereby to selectively position the valve spool. Electrohydraulic valves of this type have been expensive, have been highly sensitive to contamination, and have wasted excessive amounts of power through the flapper nozzles.

In contrast, the present invention provides a proportional-flow electrohydraulic valve that utilizes a valve spool which is positioned by an electrical force-motor for a first or pilot section, and a second section that is connected in series with, and controlled by, the first section. The advantages of the present invention are lower cost, elimination of wasted power because of the elimination of pilot flow requirements, and less sensitivity to contamination by elimination of the small diameter nozzles and small flapper clearances of flapper valve designs.

With regard to electronic controls for electrohydraulic valves, the present invention provides an advance over the prior art by providing a pulse-width-modulated driving voltage whose pulse widths are proportional to an input signal, for driving the electrical force-motor.

The pulse-width-modulated driving voltage results in a dither of the valve spool which effectively eliminates silting and sticking of the valve spool. This elimination of silting and sticking allows the use of lower spool-actuating forces and also results in both more accurate positioning of the pilot spool and more precise control of fluid flow.

The present invention also provides an advance over the prior art of electronic controls for electrohydraulic valves by incorporating an offsetting circuit in the electronic controls. The offsetting circuit is effective to increase the effective value of the pulse-width-modulated driving voltage, about proportionality to an input signal, by a manually-adjustable offset voltage.

By the use of the offset voltage as a null voltage, the pilot section may be spring pressed to a minimum or zero conductance by a predetermined spring load, and yet the output of the electrohydraulic valve may still be directly proportional and linear to the input signal.

Further, by use of an offset voltage which is greater than the null voltage, the offset voltage becomes a basic flow voltage which results in fluid flow rates from the electrohydraulic valve that are greater than direct proportionality and linearity by a predetermined fluid flow rate.

It is this basic flow voltage that is used in the crop-transporting mechanism of the present invention to achieve crop-transporting velocities that are greater than ground-speed velocities by a predetermined velocity.

DISCLOSURE OF INVENTION

In accordance with the broader aspects of the present invention, there is provided a mechanism for driving the crop-transporting mechanism of an agricultural harvesting machine at crop-transporting velocities that are greater than ground speeds of the harvesting machine, and at ratios of crop-transporting velocity to ground speed that decrease as the ground speed increases from a minimum ground speed to an intermediate ground speed.

More specifically, there is provided a mechanism for driving the crop-transporting mechanism of an agricultural harvesting machine at crop-transporting velocities that are greater than the ground speeds by a predetermined and selectively adjustable velocity.

In a preferred configuration, the present invention includes: a source of pressurized fluid; a fluid motor that is attached to the reel, or other crop-transporting mechanism, of the agricultural harvesting machines; an electrohydraulic valve that includes an electrical force-motor, that interconnects the source of fluid pressure and the fluid motor, and that controls the rotational speed of the fluid motor; a source of electrical power; a ground-speed sensor for producing an electrical input signal that is a function of ground speed; and an electronic control that is connected to the ground-speed sensor, to the source of electrical power, and to the electrical force-motor.

In a preferred configuration, the electronic control receives an input signal from the ground-speed sensor that approximates a sine wave and that is directly and linearly proportional to ground speed, and changes the input signal into an effective driving voltage that is directly and linearly proportional to the input signal and thus directly and linearly proportional to ground speed, for driving the force-motor of the electrohydraulic valve. Preferably, this effective driving voltage comprises a pulse-width-modulated voltage.

The electronic control also includes an offsetting circuit which increases the effective driving voltage by a predetermined offset voltage. The offset voltage is selected to be a basic-flow voltage. The basic-flow voltage is larger than the null voltage of the electrohydraulic valve by a value that will result in a predetermined basic flow of fluid being delivered to the fluid motor.

The output of the electrohydraulic valve is directly proportional and substantially linear to effective driving voltages above the offset voltage; and the fluid motor is sized to drive the reel at velocities that would be equal to ground speeds if it were not for the basic-flow voltage of the offsetting circuit increasing the effective driving voltage above proportionality to the ground speed and input signal. Thus, increasing the effective driving voltage by the basic-flow voltage results in the fluid motor driving the reel at velocities that are greater than ground speeds by a predetermined and substantially constant velocity.

In a preferred configuration, the electrohydraulic valve includes first and second valve sections. The first valve section includes a receiving port, an output port, and a first valve spool that controls fluid communication from the receiving port to the output port. The second valve section includes an input port, a delivery port that is connected to the receiving port of the first valve section, and a second valve spool that is controlled by the difference in fluid pressures in the receiving port and the output port of the second valve section and that controls fluid flow from the input port to the delivery port.

A spring resiliently urges the first valve spool toward a minimum-conductance position; and an electrical force-motor cooperates with the spring to move the first valve spool toward a maximum-conductance position proportional to effective driving voltages applied to the force-motor.

BRIEF DESCRIPTION OF THE DRAWINGS

FIG. 2 is a cross-sectional view of the electrohydraulic valve in which the first and second valve sections are contained in separate body castings;

FIG. 3 is a cross-sectional view of the electrical force-motor which is shown only in part in FIGS. 1 and 2, taken substantially the same as FIGS. 1 and 2;

FIG. 4 is a cross-sectional view of a portion of the force-motor of FIG. 3, taken substantially the same as FIG. 3;

FIG. 5 is a plan view of the adjusting screw of the electrical force-motor of FIG. 3, taken substantially the same as FIG. 3;

FIG. 6 is a partial and cross-sectional view of the first valve section of FIG. 2, taken substantially the same as FIG. 2, and showing the first valve spool in the maximum-conductance position;

FIG. 7 is a partial and cross-sectional view of the first valve section of FIG. 2, taken substantially the same as FIG. 2, and showing the first valve spool in a flow-restricting position;

FIG. 8 is a cross-sectional view of the first valve spool of the first working section of the FIG. 2 embodiment, taken substantially the same as FIG. 2;

FIG. 9 is a graph of the valve spool forces of the first valve section, showing total spool forces, spring load forces, and flow forces versus spool opening and force-motor voltage;

FIG. 10 is a partial and cross-sectional view of the second working section of the electrohydraulic valve of FIG. 2, taken substantially the same as FIG. 2, and showing the second valve spool restricting fluid flow from the input port to the delivery port;

FIG. 11 is a partial and cross-sectional view of the second working section of the electrohydraulic valve of FIG. 2, taken substantially the same as FIG. 2, and showing the second valve spool providing maximum conductance from the input port to the bypass port;

FIG. 12 is a cross-sectional view of the second valve spool of the second working section of the electrohydraulic valve of FIG. 2, taken substantially the same as FIG. 2;

FIG. 13 is a block diagram showing the components of the electronic control, the ground-speed sensor, a source of electrical power, and the force-motor;

FIG. 14 is a graph showing the voltage ouput versus time of the ground-speed sensor;

FIG. 15 is a graph of the voltage output versus time of the input clipper and squaring amplifier;

FIG. 16 is a graph of the voltage output versus time of the one-shot amplifier;

FIG. 17 is a graph of the voltage output versus input frequency of the averaging and offsetting circuit;

FIG. 18 is a graph of the voltage output versus time of the sawtooth generator;

FIG. 19 is a graph of voltage output versus time of the comparator;

FIG. 20 is a graph of the voltage output versus time of the power amplifier;

BEST MODE FOR CARRYING OUT THE INVENTION

Figures 1, 1A:
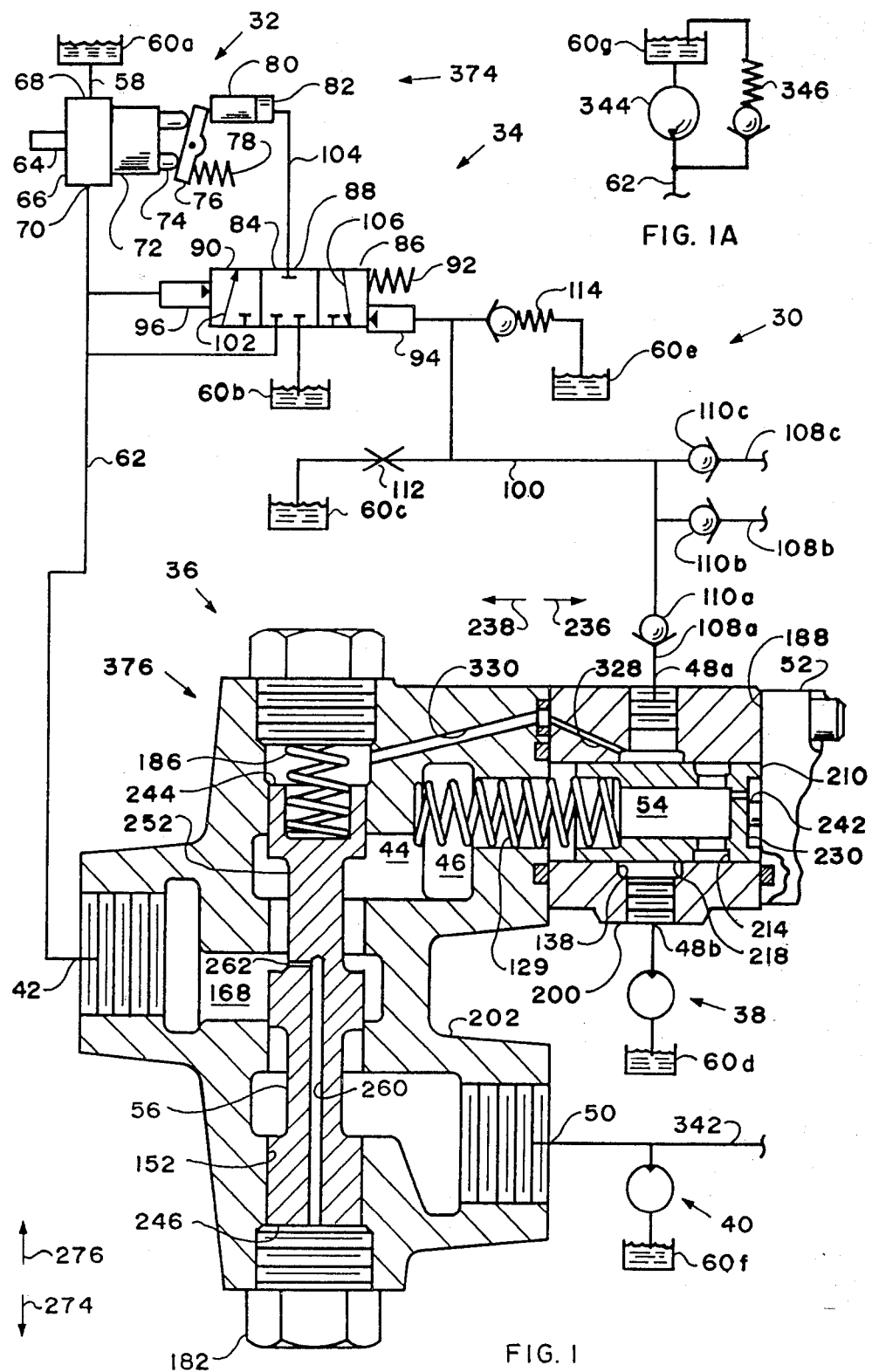
FIG. 1 is a combined drawing of a cross-sectional view of the electrohydraulic valve and a schematic of a load responsive circuit.
FIG. 1A shows a constant displacement pump for use in the hydraulic circuit of FIG. 1.

Referring now to the drawings and more particularly to FIG. 1, a load responsive hydraulic system 30 includes a variable displacement pump 32, a pump displacement control 34, an electrohydraulic valve 36, a fluid motor or reel drive motor 38, and an auxiliary fluid motor 40.

The electrohydraulic valve 36 includes an input port 42, a delivery port 44, a receiving port 46, output ports 48a and 48b, a bypass port 50, and an electrical force-motor 52.

The electrohydraulic valve 36 also includes a valving element or first valve spool 54 that controls fluid communication from the receiving port 46 to the output ports 48a and 48b, and a second valve spool 56 that controls fluid communication from the input port 42 to the delivery port 44 and from the input port 42 to the bypass port 50.

The variable displacement pump 32 receives fluid through a conduit 58 from a reservoir 60a and delivers pressurized fluid through a conduit 62 to the input port 42. Thus the variable displacement pump 32 and the reservoir 60a serve as a source of pressurized fluid for the hydraulic system 30.

The variable displacement pump 32 includes a rotatable shaft 64, a ported body 66 having an inlet port 68 that is connected to the reservoir 60a by the conduit 58 and an outlet port 70 that is connected to the conduit 62, a rotating piston body 72 with a plurality of pistons 74 being reciprocally inserted therein, and a swash plate 76 whose camming angle determines the stroke of the pistons 74 and whose camming angle is increased by a spring 78 and decreased by a piston 80 of a displacement control cylinder 82.

The pump displacement control 34 comprises a valve 84 having positions 86, 88, and 90. The valve 84 is moved to the position 86 by the combined forces of a spring 92 and a fluid operator 94 and is moved across the position 88 to the position 90 by fluid pressure applied to a fluid operator 96.

In operation, the valve 84 is moved to the position 90 whenever the force of the fluid operator 96 exceeds the combined forces of the fluid operator 94 and the spring 92. In the position 90, pressurized fluid from the conduit 62 is delivered to the displacement control cylinder 82 via a flow path 102 of the valve 84 and a conduit 104; so that the piston 80 is effective to decrease the inclination of the swash plate 76, thereby decreasing the displacement of the pump 32.

Conversely, the valve 84 is moved to the position 86 whenever the combined forces of the fluid operator 94 and the spring 92 exceed the force of the fluid operator 96. In the position 86, fluid is allowed to flow from the displacement control cylinder 82 to a reservoir 60b via the conduit 104 and a flow path 106 of the valve 84; so that the spring 78 is effective to increase the inclination of the swash plate 76, thereby increasing the displacement of the pump 32.

Preferably, the effective areas of the fluid operators 94 and 96 are equal; so that the valve 84 is moved from the position 86, across the position 88, to the position 90 whenever the fluid pressure in the conduit 62 exceeds the fluid pressure in a control signal conduit 100 by a differential pressure that is equal to the load of the spring 92 divided by the area of the fluid operator 96.

Therefore, the pump displacement control 34 is effective to control the inclination of the pump 32 to whatever inclination is required to supply the fluid flow rate into the conduit 62 that will result in the fluid pressure in the conduit 62 being greater than the fluid pressure in the control signal conduit 100 by a difference in fluid pressure that is equal to the load of the spring 92 divided by the area of the fluid operator 96.

Pressurized fluid is supplied from the ouput port 48a of the electrohydraulic valve 36 to the control signal conduit 100 by a load-sensing conduit 108a and a check valve 110a. When the load-actuating pressure, as sensed in the output port 48a decreases, the fluid pressure in the control signal conduit 100 cannot be decreased to the pressure magnitude of the fluid in the output port 48a by fluid flow back to the output port 48a because of the check valve 110a; but, instead, the fluid pressure in the control signal conduit 100 is reduced to the pressure magnitude of the fluid pressure in the output port 48a by fluid flow through an orifice 112 to a reservoir 60c.

Optionally, fluid from the conduit 62 may be used to power other fluid-actuated devices (not shown) and/or fluid from the bypass port 50 may be used to power a fluid-actuated device such as the auxiliary fluid motor 40. If fluid from the conduit 62 and/or the bypass port 50 is used to power additional fluid-actuated devices, the load-actuating pressures of these additional fluid-actuated devices may be used to control the displacement of the pump 32 by supplying these additional load-actuating pressures to the control signal conduit 100 via load-sensing conduits 108b and 108c and check valves 110b and 110c.

If several load-actuating pressures are supplied to the control signal conduit 100 by several load-sensing conduits and several check valves, as represented by the load-sensing conduits 108a–108c and the check valves 110a–110c, then the fluid pressure in the control signal conduit 100 will always be equal to the highest load-actuating pressure; and the pressure in the conduit 62 will be maintained at a predetermined pressure magnitude above the highest load-actuating pressure.

However, if the pump 32 is used to supply pressurized fluid only to the electrohydraulic valve 36, the check valve 110a may be eliminated; and the fluid pressure in the control signal conduit 100 will then be attenuated by fluid flow through the reel drive motor 38 to a reservoir 60d. Then, the attenuation flow path through the orifice 112 to the reservoir 60c is not needed.

The maximum pressure that may be supplied to the conduit 62 by the pump 32 is determined by a pilot relief valve 114 that limits the pressure in the control signal conduit 100 by fluid flow to a reservoir 60e; so that the maximum fluid pressure in the conduit 62 is equal to the pressure setting of the pilot relief valve 114 plus a differential pressure as determined by the spring 92 of the pump displacement control 34.

The load responsive circuitry as shown in conjunction with the electrohydraulic valve 36 is common to the art and has been shown and described only for the purpose of illustrating and describing the present invention.

While the electrohydraulic valve 36 has been shown in conjunction with load responsive circuitry, subsequently it will be shown that the electrohydraulic valve 36 will operate with systems in which the displacement of the pump is constant or with systems in which the output of the pump is decreased at a predetermined pressure.

Referring now to FIG. 2, an electrohydraulic valve 120 includes a first valve section 122 that is housed in a first valve body 124 and a second valve section 126 that is housed in a second valve body 128. In addition to the first valve body 124, the first valve section 122 includes the first valve spool 54 and a spring 129 that functions as a resilient bias means or gradient bias means.

The first valve body 124 includes a first spool bore 130 being disposed along a longitudinal axis 132, having a first end 134, and having a second end 136, a circumferentially enlarged portion or output port portion 138 that intercepts the bore 130 intermediate of the ends 134 and 136, the output ports 48a and 48b that communicate with the output port portion 138, the receiving port 46 that includes a receiving port portion 140 and that communicates with the first spool bore 130 via a spring-receiving bore 142, surfaces 144 and 146 that are disposed orthogonal to the longitudinal axis 132, and a pilot passage 148 that intercepts the surface 146 and that communicates with the output port 48a.

The second valve body 128 includes second spool bore 152 having ends 154 and 156, a first threaded bore portion 158 that extends coaxially outward from the second spool bore 152 to a surface 160 of the second valve body 128, a second threaded bore portion 162 that extends inwardly from a surface 164 of the second valve body 128 toward the spool bore 152 and that is coaxial therewith, and a counterbore 166 that is disposed both intermediate of and coaxially with the second spool bore 152 and the second threaded bore portion 162.

In addition, the second valve body 128 includes the input port 42, an input port portion 168 of the input port 42 that intercepts the second spool bore 152, the bypass port 50, a bypass port portion 170 of the bypass port 50 that intercepts the spool bore 152, a delivery port 172 that both intercepts the second spool bore 152 and intercepts a surface 174 of the second valve body 128, a pilot hole 176 that intercepts the surface 174 and that communicates the pilot passage 148 with the counterbore 166, a sealing-ring groove 178 that circumscribes the pilot hole 176 and that extends inwardly from the surface 174, and a sealing-ring groove 180 that circumscribes the delivery port 172 and that extends inwardly from the surface 174.

In addition to the second valve body 128, the second valve section 126 includes threaded plugs 182 and 184 that are threaded into bore portions 158 and 162 respectively, the valve spool 56, and a spring 186 that functions as a resilient means.

The electrical force-motor 52 is assembled to the first valve section 122 with a surface 188 of the force-motor 52 abutting the surface 144 of the first valve body 124. A sealing ring 190 is disposed in a sealing-ring groove 192 that circumscribes the first spool bore 130 and that extends inwardly from the surface 188 of the force-motor 52.

Sealing rings 194 and 196 are disposed in the sealing-ring grooves 178 and 180 respectively; and bolts 198 secure the electrical force-motor 52 to the first valve section 122 and secure the first valve section 122 to the second valve section 126.

Referring now to FIGS. 1 and 2, the electrohydraulic valve 36 of FIG. 1 is the preferred embodiment; and the electrohydraulic valve 120 of FIG. 2 is included for the purpose of better describing the first valve section 122 and the second valve section 126 by housing the valve sections 122 and 126 in separate, 124 and 128, valve bodies.

In the embodiment of FIG. 2, both the first valve spool 54 and the spring 129 of the first valve section 122 are contained in the first valve body 124; and both the second valve spool 56 and the spring 186 of the second valve section 126 are contained in the second valve body 128.

In contrast, in the preferred embodiment of FIG. 1, the first valve spool 54 is contained in a first valve body 200; but the spring 129 is partially contained in the first valve body 200 and is partially contained in a second valve body 202.

Referring now to FIG. 8, the first valve spool 54 includes a cylindrically-shaped outer surface 208 that extends between a first end 210 and a second end 212 of the valve spool 54, a circumferential porting groove 214 that divides the outer surface 208 into surface portions 216 and 218 and that includes a conductance-controlling end 220 and an opposite end 222, a spring-receiving counterbore 224 that extends longitudinally inward from the second end 212, a longitudinal passage 226 that extends longitudinally inward from the counterbore 224, and four radially-disposed and circumferentially-spaced holes 228 that communicate the longitudinal passage 226 to the porting groove 214.

The first valve spool 54 also includes a recess 230 that extends longitudinally inward from the first end 210 and a static balance orifice 232 that equalizes the fluid pressures on the ends 210 and 212 of the first valve spool 54. Preferably, the orifice 232 has a diameter of 1,2 millimeters.

Referring now to FIGS. 2, 6, 7, and 8, fluid flow from the receiving port 46 to the output ports 48a and 48b is via the spring-receiving bore 142, the spring-receiving counterbore 224, the longitudinal passage 226, the holes 228, the porting groove 214, and the output port portion 138.

Fluid conductance from the receiving port 46 to the output ports 48a and 48b is controlled by the proximity of the conductance-controlling end 220 of the porting groove 214 to a conductance-controlling end 234 of the enlarged portion 138.

When the first valve spool 54 moves to the position wherein the conductance-controlling end 220 of the first valve spool 54 coincides longitudinally with the conductance-controlling end 234 of the output port portion 138, as shown in FIG. 2, the first valve spool 54 is in a position which may be described as zero overlap, zero underlap, zero conductance, or minimum conductance. With the first valve spool 54 in the minimum conductance position of FIG. 2, the spring 129 resiliently urges the first valve spool 54 toward the force-motor 52 with a force that is designated as a first offset force.

Referring now to FIGS. 1, 2, 6, 7, and 8, the first valve spool 54 is movable in a first direction 236 to a maximum overlap position as shown in FIG. 1 wherein the first end 210 of the first valve spool 54 abuts the surface 188 of the force-motor 52 and wherein fluid communication between the porting groove 214 and the output port portion 138 is blocked by a maximum length of the surface portion 218. In the maximum overlap position of FIG. 1, the load of the spring 129, which serves as a gradient force means, is reduced from the first offset force to a minimum or assembled load which may be designated as a maximum overlap force.

When the first valve spool 54 is moved the maximum distance in a second direction 238, as determined by the stroke of the force-motor 52, the first valve spool 54 is in the maximum-conductance position as shown in FIG. 6 and the load of the spring 129 is at a maximum.

The first valve spool 54 is also movable to intermediate or flow-throttling positions, as illustrated by FIG. 7, wherein a flow path 240 is restricted or throttled and has a fluid conductance that is inversely proportional to the proximity of any intermediate or flow-throttling position to the minimum-conductance position of FIG. 2.

The first valve spool 54 is moved in the first direction 236 by the gradient force of the spring 129 which decreases as the first valve spool 54 is moved in the first direction 236; and the valve spool 54 is moved in the second direction 238 by an armature shaft 242 of the force-motor 52 abutting the recess 230 of the first valve spool 54.

Referring now to FIG. 12, the second valve spool 56 includes a first end 244, a second end 246, a first cylindrical land portion 248 that is juxtaposed to the first end 244, a second cylindrical land portion 250 that is juxtaposed to the second end 246, a first reduced diameter portion 252 that is juxtaposed to the first cylindrical land portion 248, a second reduced diameter portion 254 that is juxtaposed to the second cylindrical land portion 250, and a third cylindrical land portion 256 that is disposed intermediate of and juxtaposed to the reduced diameter portions 252 and 254.

The second valve spool 56 also includes a spring-receiving recess 258 that extends longitudinally inward from the first end 244, a signal passage 260 that extends longitudinally inward from the second end 246, and an orifice hole 262 that extends radially inward from the first reduced diameter portion 252 and that communicates with the signal passage 260.

Referring now to FIGS. 2, 10, and 12, but more particularly to FIG. 10, fluid conductance of the second valve section 126, from the input port 42 and from the input port portion 168 to the delivery port 172, is controlled by a conductance-controlling end 264 of the reduced diameter portion 252 and by a conductance-controlling end 266 of the inlet port portion 168.

In like manner, fluid conductance, of the second valve section 126, from the input port portion 168 to the bypass port portion 170 and to the bypass port 50 is controlled by a conductance-controlling end 270 of the reduced diameter portion 254 and by a conductance-controlling end 272 of the input port portion 168.

Referring now to FIG. 1, the spring 186 has moved the second valve spool 56 in a second direction 274 to a position wherein the second end 246 of the second valve spool 56 abuts the threaded plug 182. In FIG. 1, the second valve spool 56 is in a maximum conductance position with regard to fluid flow from the input port 42 to the delivery port 44, and is in a maximum overlap position with regard to fluid flow from the input port 42 to the bypass port 50.

Referring now to FIG. 2, the second valve spool 56 is in a minimum conductance or zero overlap position with regard to fluid flow from the input port 42 to the delivery port 172, and is in a restricted flow or throttling position with regard to fluid flow from the input port 42 to the bypass port 50.

Referring now to FIG. 10, the second valve spool 56 is in a restricted flow or throttling position with regard to fluid flow from the input port portion 168 to the delivery port 172, and is in a zero overlap or minimum conductance position with regard to fluid flow from the input port portion 168 to the bypass port portion 170.

Referring now to FIG. 11, the second valve spool 56 of the second valve section 126 of FIG. 2 has been moved in a first direction 276 to a position wherein the end 244 of the second valve spool 56 abuts the threaded plug 184. With regard to fluid flow from the input port portion 168 to the delivery port 172, the second valve spool 56 is in a maximum overlap position; and with regard to fluid flow from the input port portion 168 to the bypass port portion 170, the second valve spool 56 is in a maximum conductance position.

Referring now to FIGS. 3-5, the electrical force-motor 52 includes a fluid-tight force-motor housing 282 being disposed circumferentially around the longitudinal axis 132 and having a chamber 284 that is disposed circumferentially around the longitudinal axis 132. The force-motor 52 also includes an armature assembly 286 comprising an armature 288 that is circumferentially disposed around the longitudinal axis 132 and that is disposed within the chamber 284, and comprising the armature shaft 242 that is connected to the armature 288 and that is journaled in an end plate 292 of the housing 282 in an opening or bushing bore 294 for rectilinear movement along the longitudinal axis 132.

The force-motor 52 further includes a force-motor coil 296 that is circumferentially disposed in the chamber 284 of the housing 282 radially intermediate of the armature 288 and the housing 282, and force-motor terminals 298a and 298b that are connected to the force-motor coil 296.

The housing 282 includes a shell 300, the end plate 292 that includes the surface 188 and the sealing-ring groove 192, a terminal body 304 that sealingly mounts the terminals 298a and 298b into the shell 300 and that insulates the terminals 298a and 298b from the shell 300, and a manual actuation assembly 306.

The manual actuation assembly 306 includes a thimble 308 with an internally threaded bore portion 310 and an internal sealing groove 312, an actuating screw 314 with a threaded portion 316, with an enlarged head 318, with a shank portion 320, and with a screwdriver slot 322, and a sealing ring 324.

Referring to FIGS. 2–5, the armature shaft 242 is forced in the second direction 238 by an effective driving voltage applied to the terminals 298a and 298b, or by screwing the enlarged head 318 in the second direction 238 and moving the armature shaft 242 by mechanical contact between the enlarged head 318 and the armature shaft 242.

The armature assembly is maintained in longitudinal hydrostatic balance by a hole 326 that is disposed in the end plate 292 and that communicates the chamber 284 with both the recess 230 and the static balance orifice 232 of the first valve spool 54.

Referring now to FIG. 1, if fluid is being supplied to conduit 62 and to the input port 42 at a constant flow rate by a constant displacement pump 344 of FIG. 1A rather than by the variable displacement pump 32, and if the auxiliary fluid motor 40 is removed so that the bypass port 50 discharges directly into a reservoir 60f, then the operation of the electrohydraulic valve 36 is as follows:

Initially, the valve spools 54 and 56 will be spring pressed to positions shown in FIG. 1. Application of an effective driving voltage, that is equal to the null voltage, to the force-motor coil 296 of FIG. 3 will result in the first valve spool 54 being moved in the second direction 238 to the zero overlap, or minimum conductance, position of FIG. 2.

However, if an effective driving voltage is applied to the force-motor coil 296 that is larger than the null voltage, then the first valve spool 54 will be moved to a position wherein a flow path 240, as shown in FIG. 7, will be opened from the receiving port 46 to the output ports 48a and 48b.

Referring now to FIGS. 1 and 7, the opening of the flow path 240 of FIG. 7 allows fluid to flow from the input port 42 to the output ports 48a and 48b via the annular space between the reduced diameter portion 252 and the second spool bore 152. This fluid flow develops a pressure differential between the receiving port 46 and the output ports 48a and 48b that is a direct function of the fluid flow rate and that is an inverse function of the conductance of the flow path 240.

The fluid pressure in the receiving port 46 is sensed by the orifice hole 262 and is applied to the second end 246 of the second valve spool 56 via the signal passage 260; and the fluid pressure in the output port 48a is applied to the first end 244 of the second valve spool 56 via signal passages 328 and 330.

If the fluid flow rate of the constant displacement pump 344 is greater than the flow rate for which the electrohydraulic valve has been set by a given effective driving voltage and by a resultant conductance of the flow path 240 of FIG. 7, then a pressure differential is developed between the receiving port 46 and the output port 48a that is sufficient to move the valve spool 56 in the first direction 276; and fluid flow from the inlet port portion 168 to the delivery port, 44 of FIG. 1 or 172 of FIGS. 2, 10, or 11, will be restricted or throttled by the second valve spool 56 being moved to the restricted flow position or throttling position of FIG. 10.

If the restriction of fluid flow as shown in FIG. 10 is not sufficient to cause excess flow of the constant displacement pump 344 of FIG. 1A to go over a relief valve 346 to a reservoir 60g, then the second valve spool 56 will be moved farther in the first direction 276, to the position as shown in FIG. 2, or even to the position as shown in FIG. 11; and the second valve spool 56 will bypass excess fluid to the bypass port 50 and to the reservoir 60f; with the result that a substantially constant and predetermined differential pressure will be maintained across the flow path 240 of FIG. 7.

Figures 27, 28:
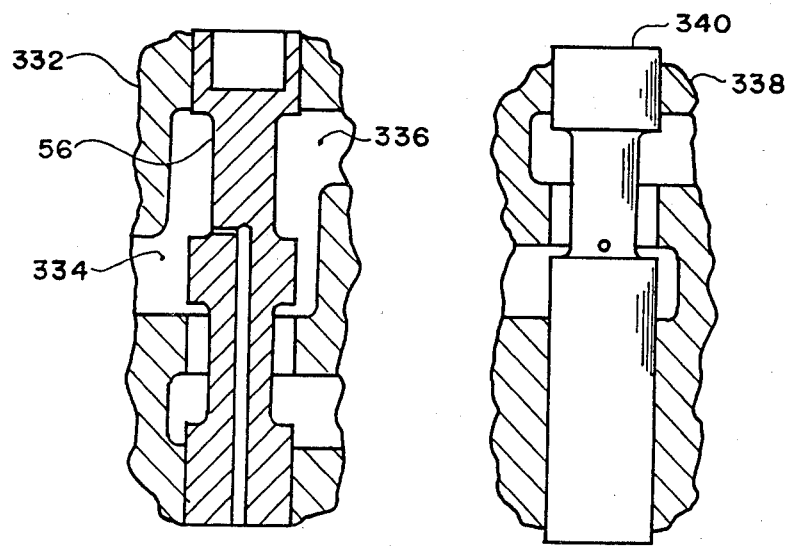
FIG. 27 is a partial and cross-sectional view of a second valve section that has been modified to provide only bypass-flow control of the fluid that is delivered to the receiving port of the first valve section.
FIG. 28 is a partial and cross-sectional view of second valve section that has been modified to provide only restriction control of the fluid that is delivered from the input port to the receiving port of the first valve section.

For the conditions described above, wherein the auxiliary fluid motor 40 is eliminated and wherein the source of pressurized fluid is the constant displacement pump 344, control of the pressure of the fluid supplied to the receiving port 46, and thus control of the pressure differential across the flow path 240 of FIG. 7, can be done entirely by bypassing excess flow. Therefore, a body casting 332, as shown in FIG. 27, can be designed to prevent the second valve spool 56 from restricting fluid flow from an inlet port portion 334 to a delivery port 336.

If the constant displacement pump 344 of FIG. 1A is used in conjunction with the electrohydraulic valve 36 of FIG. 1, and if the auxiliary fluid motor 40 is retained in the circuit, then the second valve spool 56 will restrict fluid flow from the input port 42 to the delivery port 44, or will bypass excess fluid from the input port 42 to the bypass port 50, depending upon the relative load-actuating pressures of the reel drive motor 38 and the auxiliary fluid motor 40, and depending upon the conductance of the flow path 240 of FIG. 7; and the second valve spool 56 will control the pressure magnitude of the fluid pressure that is supplied to the receiving port 46 to whatever values are required to maintain the predetermined differential pressure across the flow path 240 of FIG. 7.

If the constant displacement pump 344, or, if a pump (not shown) whose displacement decreases at a predetermined pressure, is used in conjunction with the electrohydraulic valve 36 of FIG. 1, and if it is desired to attach additional fluid-actuated devices (not shown) to the conduit 62, then the bypassing function must be eliminated so that sufficient pressure will be maintained to operate the additional fluid-actuated devices (not shown) that are connected to the conduit 62. For use in this type of circuit, a body casting 338 and a valve spool 340, as shown in FIG. 28, may be used to eliminate the bypassing function. Or, the bypass port 50 of the electrohydraulic valve 36 of FIG. 1 may be plugged.

When the electrohydraulic valve 36 is used in a load responsive circuit as shown in FIG. 1, both the standby pressure of the system, and the pressure differential between the conduit 62 and the control signal conduit 100 are equal to the load of the spring 92 divided by the effective area of the fluid operator 96.

If the auxiliary fluid motor 40 is removed from the circuit, and if no load-actuating pressures are introduced through the conduits 108b and 108c, then the fluid pressure in the conduit 62 will be maintained, by changes in the inclination of the swash plate 76 and by a resultant change in fluid flow rate, at values that are always greater than the load-actuating pressures of the reel drive motor 38 by a constant and predetermined pressure differential in accordance with the load of the spring 92 of the pump displacement control 34.

If this constant and predetermined pressure differential, as determined by the spring 92, is less than the pressure differential, as determined by the spring 186, that is required to move the second valve spool 56 in the first direction 276, then for the above-stated conditions, the second valve spool 56 will not move, and the second valve section 126 of FIG. 2 may be eliminated.

Referring again to FIG. 1, if the auxiliary fluid motor 40 is retained in the hydraulic system 30, the load-actuating pressure of the auxiliary fluid motor 40 may be used to control the displacement of the pump 32, and to control the resultant pressure in the conduit 62, by connecting a conduit 342 from the fluid motor 40 to the load-sensing conduit 108c.

Then, the pressure in the conduit 62 will be maintained at a value that is greater than the load-actuating pressure of the fluid motor 40 by a value as determined by the spring 92 of the pump displacement control 34; or, at a higher value if the reel drive motor 38 is operating at a higher load-actuating pressure than the auxiliary fluid motor 40; and the second valve spool 56 will move to the position of FIG. 10 to restrict fluid flow to the receiving port 46, or to the position of FIG. 2 to restrict fluid flow to the bypass port 50, in order to control the pressure magnitude of the fluid pressure that is supplied to the receiving port 46 and thereby to control the pressure differential across the flow path 240 to the aforesaid predetermined pressure differential.

In summary, movement of the second valve spool 56 is controlled by the differential pressure across the flow path 240 of the first valve spool 54; and this movement of the second valve spool 56 controls the magnitude of the fluid pressure in the receiving port 46 to whatever pressure is required to maintain a predetermined and substantially constant pressure differential across the flow path 240.

This predetermined pressure differential is substantially equal to the load of the spring 186 divided by the effective area of the second end 246 of the second valve spool 56, and preferably is equal to 2.48 Bars.

Referring now to FIGS. 6 and 7, fluid flow through the flow path 240 produces a flow force on the first valve spool 54 that is in the first direction 236. That is, the flow force applies a force to the first valve spool 54 that is in the same direction as, and adds to, the force of the spring 129 of FIG. 2.

Referring now to FIG. 9, because this flow force is a function of the rate of fluid flow, the flow force is nonexistent at the zero-opening position of the valve spool and at negative-opening positions. Therefore, the total forces on the valve spool 54, from a spool-opening position of −1.5 millimeters to a spool-opening position of 0.0 millimeters, are equivalent to the spring load forces of the spring 129.

However, from the spool-opening position of 0.0 millimeters to a spool-opening position of +1.5 millimeters, the total forces on the valve spool 54 are the sum of the spring load forces of the spring 129 and the flow forces.

The flow forces are equal to the square root of the pressure differential across the flow path 240, multiplied by the rate of fluid flow, and multiplied by a constant.

However, the pressure differential across the flow path 240 is maintained at a substantially constant value by movement of the second valve spool 56, as previously described. Therefore, since the square root of a constant number is a constant, the flow forces are equal to the rate of fluid flow multiplied by a second constant; so the flow forces are directly proportional and linear to the rate of fluid flow across the flow path 240.

Further, because the pressure differential across the flow path 240 is substantially constant, the rate of fluid flow through the flow path 240 will be directly proportional and substantially linear to the conductance of the flow path 240.

In addition, because the conductance-controlling ends 220 and 234 are circumferential shoulders, the conductance of the flow path 240 is directly and linearly proportional to movement in the second direction 238 of the first valve spool 54 from the minimum conductance position of FIG. 2.

Therefore, the flow forces will be directly and linearly proportional to movement of the first valve spool 54 between spool-opening positions of 0.0 and +1.5 millimeters.

The flow forces increase linearly from 0.0 Newtons at the spool-opening position of 0.0 millimeters to 10.0 Newtons at a spool-opening position of +1.5 millimeters wherein 82 liters per minute are flowing through the flow path 240 at a pressure differential of 2.48 Bars.

The spring load forces increase from 7.0 Newtons at the assembled load, to 17.5 Newtons at the spool-opening position of 0.0 millimeters, or minimum-conductance position, and to 28.0 Newtons at the spool-opening position of +1.5 millimeters, or maximum-conductance position. These increases in spring-load forces are linear with respect to movement of the first valve spool 54 by virtue of the spring 129 having equal diameter coils as shown in FIGS. 1 and 2.

Thus, the total forces on the first valve spool increase linearly from 7.0 Newtons to 17.5 Newtons from a spool-opening position of −1.5 millimeters to a spool-opening position of 0.0 millimeters, and increase linearly from 17.5 Newtons to 38.0 Newtons from the spool-opening position of 0.0 millimeters to the spool-opening position of +1.5 millimeters. However, the total spool forces increase at a greater rate between the spool-opening positions of 0.0 and +1.5 millimeters because of the addition of the flow forces to the spring load forces.

The force-motor 52 develops approximately 4.75 Newtons per volt; so an effective driving voltage of 3.7 volts develops an offset force of 17.5 Newtons and is effective to move the first valve spool 54 to the spool-opening position of 0.0 millimeters. Thus the null voltage of the electrohydraulic valve is 3.7 volts. An effective driving voltage of 8.0 volts develops a force of 38.0 Newtons and is effective to move the first valve spool 54 to the spool-opening position of 1.5 millimeters.

Therefore, because of the linearity of the force-motor 52, the linearity of the forces of the spring 129, and the linearity of the flow forces, movement of the valve spool 54, from the minimum-conductance position of FIG. 2, is linear to those portions of effective driving voltages that are in excess of the null voltage. Further, because conductance of the flow path 240 of FIG. 7 is linear to movement of the valve spool 54 from the minimum-conductance position of FIG. 2, and because the pressure differential across the flow path 240 is constant, the rate of fluid flow from the input port 42 to the output ports 48a and 48b is directly proportional and substantially linear to effective driving voltages that are in excess of the null voltage. This is true irrespective of changes in fluid pressure supplied to the input port 42, irrespective of changes in load-actuating pressure of the reel drive motor 38, and irrespective of changes in the load-actuating pressure of the auxiliary fluid motor 40.

If this linearity between effective driving voltage and fluid flow can be maintained with sufficient accuracy, then systems such as the reel drive system of FIG. 1 can be designed without the expense of the use of feedback systems to achieve correction of flow versus driving voltage.

Subsequently, an electronic system will be described which, when used in cooperation with the electrohydraulic valve 36 of FIG. 1, achieves substantial linearity between the effective driving voltage and the resultant fluid flow to the output ports 48a and 48b. However, the various components of the total system will be enumerated before describing the electronic system in detail.

Figure 26:
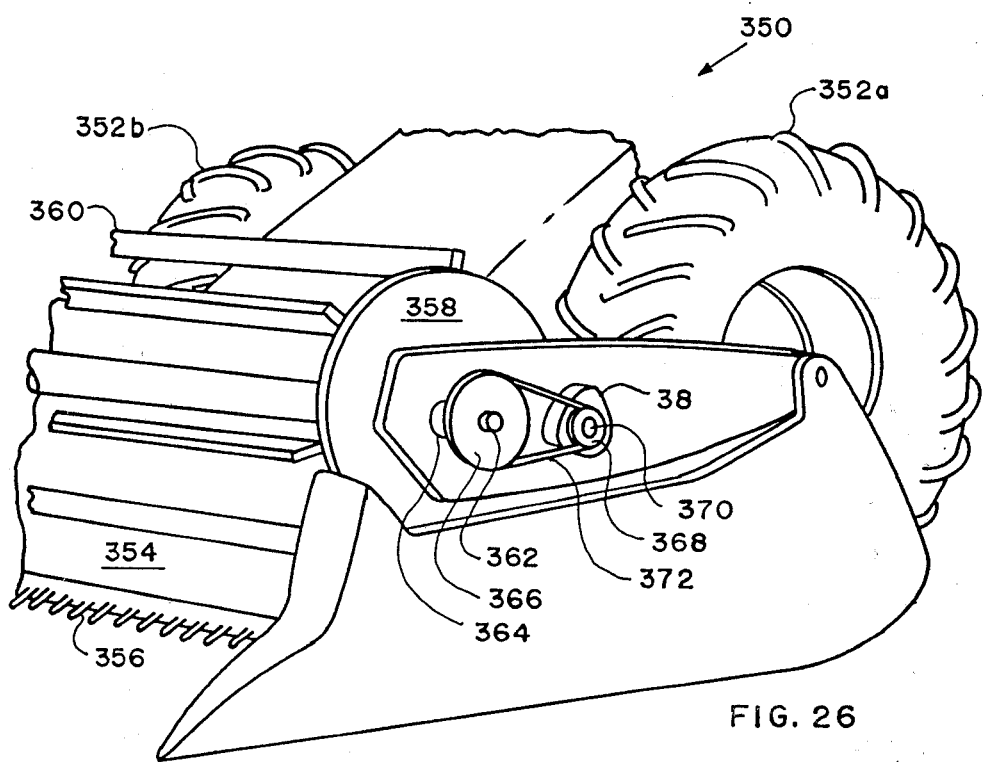
FIG. 26 is a partial and perspective view of a combine showing a portion of the reel and showing a fluid motor drivingly connected to the reel.

Referring now to FIG. 26, an agricultural harvesting machine 350 includes drive wheels 352a and 352b, a grain-receiving platform 354, a cutter bar assembly 356, a crop-transporting mechanism or reel 358 that includes reel bats 360 and a shaft 362 that is journaled for rotation in a bearing 364.

Means for driving the crop-transporting mechanism or reel 358 includes a pulley 366 that is attached to the shaft 362, a pulley 368 that is attached to a rotary output shaft 370 of the reel drive motor 38 that was shown schematically in FIG. 1, and a drive belt 372 that transmits power from the pulley 368 to the pulley 366.

Means for driving the crop-transporting mechanism 358 of FIG. 26 also includes components of the hydraulic system 30 of FIG. 1 as follows: a source of pressurized fluid 374 comprising the pump 32 and the reservoir 60a, the electrohydraulic valve 36 comprising a hydraulic valve 376 and the electrical force-motor 52, and the reel drive motor 38 which previously was included.

Means for driving the crop-transporting mechanism 358 of FIG. 26 further includes components shown in FIG. 13 as follows: a source of electrical power 378, a ground-speed sensor 380, and an electronic control 382 that is connected to the source of electrical power 378 to receive electrical power therefrom, that is connected to the ground-speed sensor 380 to receive an input signal therefrom, and that is connected to the force-motor 52 to apply an effective driving voltage thereto.

The source of electrical power 378 preferably is a wet-cell storage battery such as is used in conjunction with internal combustion engines; and the ground-speed sensor 380 preferably is of the induction type. The ground-speed sensor 380 is located in close proximity to any toothed wheel or gear, such as a wheel or a wheel drive gear 384, that rotates at a substantially fixed ratio to one or both of the drive wheels 352a or 352b of FIG. 26.

Typically, a ground-speed sensor, of the type described, produces a signal whose frequency is in exact accord with the number of teeth 386 per second, of the gear 384, that pass an armature 388 of the sensor 380, whose wave form approximates a sinusoidal curve, and whose amplitude is directly proportional to the number of teeth 386 per second that pass the armature 388.

The electronic control 382 includes an input clipper and squaring amplifier 390, a one-shot amplifier 392, an averaging and offsetting circuit 394, a sawtooth generator 396, a comparator 398, and a power amplifier 400.

Referring now to FIGS. 13–20, the output voltage of the ground-speed sensor 380, although approximating a sinusoidal curve 410, may include voltage spikes 412, as shown in FIG. 14.

The input clipper and squaring amplifier 390 clips the voltage spikes 412 from the sinusoidal curve or sinusoidal input signal 410 and produces an output that is a square wave as shown by a curve or first square wave signal 414 of FIG. 15. The frequency of the curve 414 is the same as the frequency of the sinusoidal curve 410; and pulsed durations 634 are substantially half of a period 415.

The one-shot amplifier 392 produces an output that is a square wave as shown by a curve or second square wave signal 416 and that has the same frequency as the curve 414 of the input clipper and squaring amplifier 390; but a pulsed duration 418 of the second square wave signal 416 is manually adjustable by means which will be described subsequently.

The averaging and offsetting circuit 394 produces a D.C. voltage that is a function of three variables. The first of these three variables is the frequency of the output of the one-shot amplifier 392, as shown in FIG. 16; and the second of these three variables is the pulsed duration 418 of the output of the one-shot amplifier 392. The output of the averaging and offsetting circuit 394 is directly and linearly proportional to the frequency, and inversely and linearly proportional to a period 417, of the output of the one-shot amplifier 392. Also, the output of the averaging and offsetting circuit 394 is directly and linearly proportional to the pulsed durations 418 of the one-shot amplifier 392. That is, with increased frequency, and a resultant decrease in the periods 417, a given pulsed duration 418 is a larger percentage of the period 417; or with constant frequency, and a resultant constant period 417, an increase in pulsed duration 418 is a larger percentage of the period 417.

Thus the voltage output of the averaging and offsetting circuit 394 is represented by a curve or D.C. output signal 420 of FIG. 17 that is a straight line and whose slope 422 is directly and linearly proportional to the pulsed duration 418 of FIG. 16.

Because of provision for manually adjusting the pulsed duration 418, by means that will be described subsequently, the slope 422, which represents the proportionality between the frequency of the sinusoidal curve 410 of FIG. 14 and the D.C. output signal 420 that is produced by the averaging and offsetting circuit 394, is manually adjustable.

The third variable that determines the output of the averaging and offsetting circuit 394 is an offset signal which the averaging and offsetting circuit 394 provides. This offset signal increases the D.C. output signal 420 of the averaging and offsetting circuit 394 above proportionality to the frequency and the pulsed duration 418 of the one-shot amplifier 392, by a value as determined by manual adjustment of the offsetting and averaging circuit 394, as will be described subsequently.

Therefore, the averaging and offsetting circuit 394 performs three functions. One function is to produce a first D.C. voltage that is a function of both the frequency of the output of the one-shot amplifier 392 and the pulsed duration 418 thereof. A second function is to produce a second D.C. voltage or offset signal that is selectably adjustable and substantially constant; and the third function is to sum the first and second D.C. voltages.

Curves, or increased D.C. output signals, 424 and 426 of FIG. 17 illustrate that the averaging and offsetting circuit 394 is selectably adjustable to produce an output voltage that is not only proportional to the frequency of the output of the one-shot amplifier 392 but that also is greater than said proportionality by a selected and substantially constant value.

The sawtooth generator 396 produces a sawtooth wave form 428 as shown in FIG. 18. The voltage output of the wave form 428 varies from approximately 1.5 to 5.5 volts; and preferably the frequency of the wave form 428 is 200 hertz.

The comparator 398 receives a D.C. voltage from the averaging and offsetting circuit 394 that is greater than proportionality, with respect to the frequency of the sinusoidal curve 410, by a predetermined and substantially constant offset voltage that is provided by the averaging and offsetting circuit 394. The comparator 398 also receives the sawtooth wave form 428 from the sawtooth generator 396.

The comparator 398 produces an output voltage whenever the voltage that is supplied by the averaging and offsetting circuit 394 instantaneously exceeds the voltage that is supplied by the sawtooth generator 396.

As an example, if the sawtooth wave form 428 varies from 1.5 to 5.5 volts, and if the output of the averaging and offsetting circuit 394 is 3.5 volts, then the comparator 398 will produce an output voltage for fifty percent of the time; but if the output of the averaging and offsetting circuit 394 is only 2.5 volts, then the comparator will produce an output voltage for only twenty-five percent of the time.

Thus, the comparator 398 and the sawtooth generator 396 cooperate to provide pulse-width modulation means as shown by a curve, or pulse-width-modulated control signal, 402 of FIG. 19. The frequency of the pulses is equal to the frequency of the sawtooth generator 396; and the pulse widths 404 are proportional to the voltage output of the averaging and offsetting circuit 394.

The power amplifier 400 produces a wave form as shown by a curve, or effective driving voltage, 406 of FIG. 20. Since the output of the power amplifier 400 follows the input that is supplied to it by the comparator 398, the output of the power amplifier 400 is also a pulse-width-modulated voltage; and the pulse widths 408 of the curve 406 are identical with the pulse widths 404 of the curve 402.

However, the power amplifier 400 increases the current capacity of the pulse-width-modulated control signal that is produced by the comparator 398; so that the output of the power amplifier 400 can be called a cyclic driving voltage, or an effective driving voltage, that is pulse-width modulated.

The pulse-width-modulated driving voltage of the power amplifier 400 is applied to the force-motor 52. Since the force-motor 52 is unable to respond to a frequency of 200 hertz, the pulse-width-modulated driving voltage acts as an effective driving voltage whose effective voltage is directly and linearly proportional to the width of the pulse widths 408.

Figure 21:
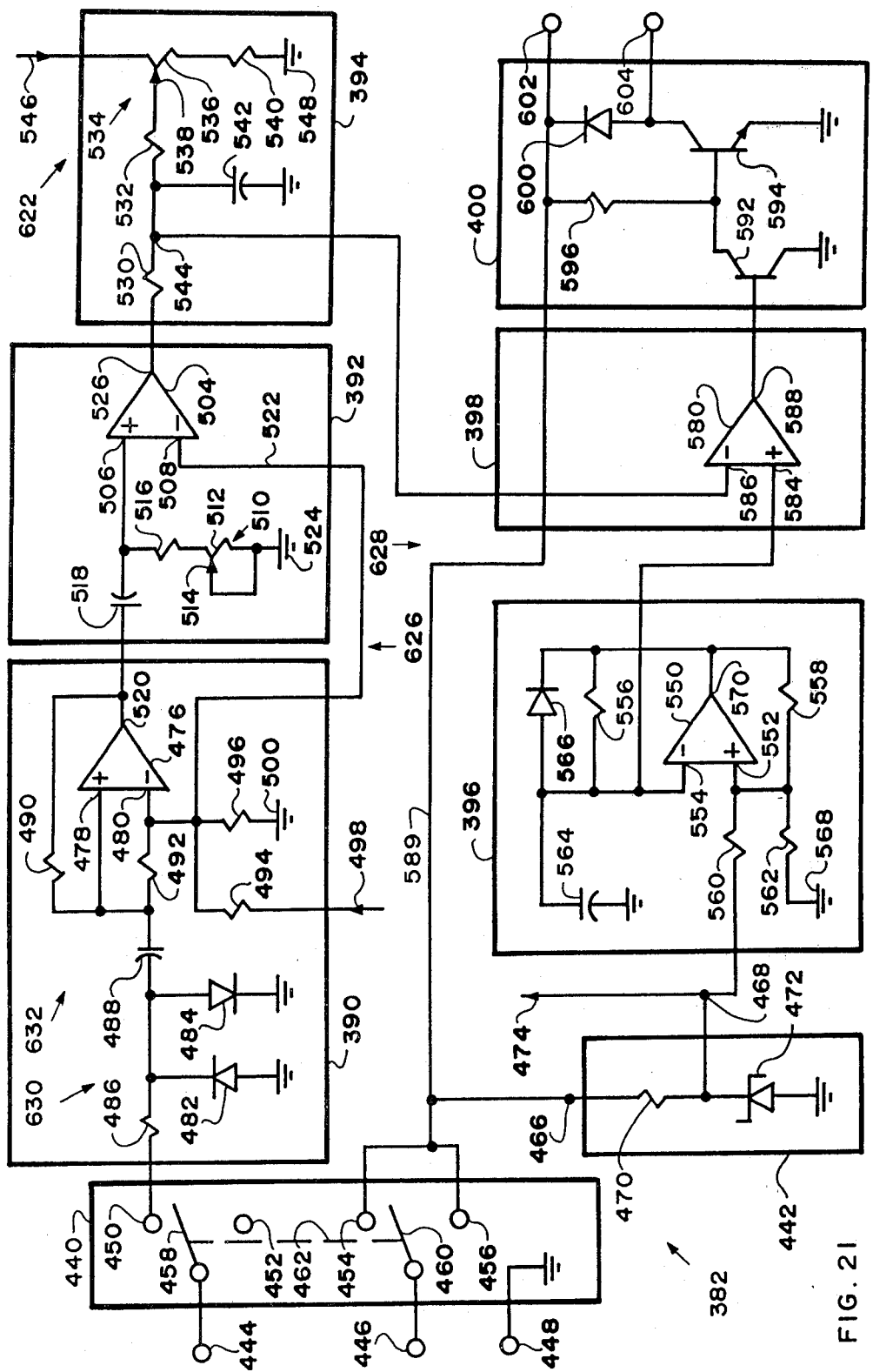
FIG. 21 is a detailed schematic diagram of the electronic control.

The components of the electronic control 382, which are shown in block diagram form in FIG. 13, are shown in diagrammatical form in FIG. 21; and two more components of the electronic control 382, which are not shown in FIG. 13, are included in FIG. 21.

Referring now to FIG. 21, the electronic control 382 includes the following components which previously have been named and described in conjunction with FIG. 21: the input clipper and squaring amplifier 390, the one-shot amplifier 392, the averaging and offsetting circuit 394, the sawtooth generator 396, the comparator 398, and the power amplifier 400.

In addition to the aforementioned components, the electronic control 382 includes a mode switch 440 and a voltage regulator 442.

The mode switch 440 includes a signal input terminal 444 for connection to the ground-speed sensor 380 of FIG. 13, a power input terminal 446 for connection to the source of electrical power 378 of FIG. 13, and a ground terminal 448 which may be used, in conjunction with the terminals 444 and 446, to input both the signal from the ground-speed sensor 380 and the source of electrical power 378. The mode switch 440 is a double-pole double-throw switch, and includes signal output terminals 450 and 452, power output terminals 454 and 456, contactors 458 and 460, and a contact actuator 462.

The mode switch 440 includes an off-position, as shown, wherein the contactor 458 is electrically isolated from the terminals 450 and 452 and wherein the contactor 460 is electrically isolated from the terminals 454 and 456. The mode switch 440 also includes an automatic-control position (not shown) and a manual-control position (not shown). Operation of the mode switch 440 in the automatic-control and manual-control positions will be described subsequently.

The voltage regulator 442 includes an input terminal 466, an output terminal 468, a ballast resistor 470, and a Zener diode 472. The diode 472 has a reverse voltage of approximately 8.0 volts. The diode 472 and the ballast resistor 470 are effective to maintain a voltage to the output terminal 468 that is substantially constant because of the low current drain of the other components of the electronic control 382 and because the ballast resistor 470 is sized to bypass current through the diode 472 that is approximately as large as the current requirements at the output terminal 468. Regulated voltage from the voltage regulator 442 is represented by an arrow 474.

The input clipper and squaring amplifier 390 includes an operational amplifier 476 having a positive input terminal 478 and a negative input terminal 480, diodes 482 and 484, an input coupling resistor 486, a D.C. blocking capacitor 488, a feedback resistor 490, a coupling resistor 492, and bias resistors 494 and 496.

The input coupling resistor 486 is connected to the terminal 450 of the mode switch 440 and delivers the sinusoidal input signal of the ground-speed sensor 380 to the diodes 482 and 484. The diodes 482 and 484 have a forward voltage of approximately 0.6 volts; so the diodes 482 and 484 are effective to limit the peak-to-peak voltage of the curve 410 of FIG. 14, including the voltage spikes 412, to 1.2 volts. Thus, the blocking capacitor 488 receives an alternating current voltage, which may be somewhat sinusoidal in form, whose frequency is dependent upon the ground speed of the agricultural harvesting machine 350 of FIG. 26, and which is limited to 1.2 volts.

The bias resistors 494 and 496 are connected in series between an arrow 498, which represents connection to the arrow 474 of the voltage regulator 442, and a ground 500; and the resistors 494 and 496 are sized to provide a bias voltage of approximately 4.0 volts to the input terminal 480 of the operational amplifier 476. Biasing the input terminal 480 above ground substantially eliminates any problem of the input clipper and squaring amplifier 390 producing spurious signals as a result of electrical noise that may be superimposed onto the curve 410 of FIG. 14.

The feedback resistor 490 provides a positive feedback to the positive input terminal 478 and is effective to provide electrical hysteresis with regard to input signals applied to the positive input terminal 478. Preferably the feedback resistor 490 is sized to provide a hysteresis of approximately 0.3 volts both above and below ground.

The output of the input clipper and squaring amplifier 390 is a square wave having a frequency that is equal to the frequency of the output of the ground-speed sensor 380 and having a voltage that varies from 0.0 to 8.0 volts positive. The wave form produced by the input clipper and squaring amplifier 390 is shown by the curve 414 of FIG. 15.

The one-shot amplifier 392 includes an operational amplifier 504 having a positive input terminal 506 and a negative input terminal 508, a ratio-adjusting potentiometer 510 having a resistance element 512 and an arm 514, a resistor 516, and a timing capacitor 518. The positive input terminal 506 of the amplifier 504 is connected to an output terminal of the amplifier 476 by the capacitor 518; and the negative input terminal 508 is connected to the bias resistors 494 and 496 by a conductor 522.

Thus, the positive input terminal 506 receives the square wave that is produced by the input clipper and squaring amplifier 390; and the negative input terminal is biased above ground as has been described for the input terminal 480 of the amplifier 476.

The resistor 516 is connected to both the positive input terminal 506 of the amplifier 504 and to the timing capacitor 518; and the potentiometer 510 is connected in series between the resistor 516 and a ground 524. Thus the combined resistances of the potentiometer 510 and the resistor 516, as determined by manual positioning of the arm 514 of the potentiometer 510, determine the discharge rate of the capacitor 518.

When the combined resistance of the resistor 516 and the potentiometer 510 is reduced by moving the arm 514 toward the resistor 516, the discharging rate of the capacitor 518 is increased; and the increased discharging rate of the capacitor 518 means that the trigger voltage, that is required to produce an output voltage at an output terminal 526 of the amplifier 504, is available for a shorter time.

Thus, a decrease in the aforesaid total resistance results in a decrease in the pulsed duration 418 of the curve 416 of FIG. 16. In like manner, an increase in the aforesaid combined resistance results in slower discharge of the capacitor 518 and an increase in the pulsed duration 418.

Therefore, the potentiometer 510 functions as a means for manually adjusting the ratio between the ground-speed sensor 380 and the force-motor 52 of FIG. 13; and this manual adjustment of ratio allows the use of a standardized model of the electronic control 382 on harvesting machines of various manufacturers, irrespective of the number of teeth 386 on the gear 384 of FIG. 13, and irrespective of the ratio between the ground speed of the harvesting machine and the rotational speed of the gear 384.

The averaging and offsetting circuit 394 includes summing resistors 530 and 532, an offset potentiometer 534 having a resistance element 536 and a manually-adjustable arm 538, an offset resistor 540, and an averaging capacitor 542.

The averaging and offsetting circuit 394 develops a D.C. output voltage at a junction 544 that is a function of the frequency of the curve 416 of FIG. 16 as produced by the one-shot amplifier 392, that is a function of the pulsed duration 418 of the curve 416, and that is a function of the position of the arm 538 of the potentiometer 534.

The offset potentiometer 534 is connected in series with the offset resistor 540; and the potentiometer 534 and the resistor 540 are connected in series between an arrow 546, which represents connection to the regulated output voltage of the voltage regulator 442, and a ground 548. Manual positioning of the arm 538 is effective to selectively supply an offset signal, which is a D.C. voltage, to the summing resistor 532.

The capacitor 542 is charged by the pulsed D.C. voltage that is received from the output terminal 526 of the amplifier 504, is charged by whatever offset signal is provided by selective adjustment of the potentiometer 534, and is discharged by current flow back through the resistor 530 when the potential of the output terminal 526 goes to ground.

The voltage output of the averaging and offsetting circuit 394, at the junction 544, is directly and linearly proportional to the frequency of the output of the one-shot amplifier 392, is directly and linearly proportional to the pulsed duration 418 of the curve 416 of FIG. 13, and is increased above the aforesaid proportionalities by the offset signal that is provided by the potentiometer 534 and the resistor 540.

The voltage ouput of the averaging and offsetting circuit 394 is shown in FIG. 17. The curve 420 indicates the voltage output of the averaging and offsetting circuit 394 versus frequency when there is no offset signal supplied by the offset potentiometer 534; and the slope 422 of the curve 420 is determined by the pulsed duration 418 of the output of the one-shot amplifier 392, as shown by the curve 416 of FIG. 16. Further, since the pulsed duration 418 is determined by the manual positioning of the arm 514 of the potentiometer 510, the slope 422 of the curve 420 is also determined by the position of the arm 514.

The curves 424 and 426 represent the voltage output of the averaging and offsetting circuit 394 versus frequency of the one-shot amplifier 392 for two different positions of the arm 538 of the offset potentiometer 534 and two different offset signals.

The sawtooth generator 396 includes an operational amplifier 550 having a positive input terminal 552 and having a negative input terminal 554, feedback resistors 556 and 558, bias resistors 560 and 562, a RC network capacitor 564 and a diode 566.

The resistors 560 and 562 are connected in series between the output terminal 468 of the voltage regulator 442 and a ground 568 to provide a positive bias to the positive input terminal 552.

The feedback resistor 556 determines the charging rate of the capacitor 564, as does the size of the capacitor 564. If it were not for the diode 566, a triangular wave form would be developed whose frequency would be dependent upon the RC constant of the resistor 556 and the capacitor 564. However, when the capacitor 564 is charged to a voltage that is equal to the voltage at the positive input terminal 584, as determined by the resistors 558, 560, and 562, the voltage output at an output terminal 570 of the amplifier 550 decreases to ground potential, allowing the capacitor 564 to be discharged rapidly by current flow through the diode 566 to the output terminal 570, and causing a rapid decrease in voltage at the negative input terminal 554.

Thus the resultant wave form is the sawtooth wave form 428 of FIG. 18. The sawtooth wave form 428 varies from 1.5 to 5.5 volts. Both the minimum voltage of 1.5 volts and the maximum voltage of 5.5 volts are determined by the bias voltages that are applied to the positive input terminal 552. These bias voltages are dependent upon the resistors 558, 560, and 562 and also upon changes in potential at the output terminal 570.

The comparator 398 includes an operational amplifier 580; and, in accordance with standard practice, in actual construction, the comparator 398 includes a pull-up resistor (not shown) which is connected between an output terminal 588 of the amplifier 580 and a power bus 589. The amplifier 580 includes a positive input terminal 584, a negative input terminal 586, and the output terminal 588. The positive input terminal 584 receives the sawtooth wave form 428 of FIG. 18 from the sawtooth generator 396; and the negative input terminal 586 receives a D.C. output voltage from the averaging and offsetting circuit 394, whether it be an output voltage that includes an offset voltage such as is represented by the curves 424 of FIG. 17, or whether it be an ouput voltage without the addition of the offset voltage as represented by the curve 420.

The output of the comparator 398, at the output terminal 588, is a pulse-width-modulated signal, as shown by the curve 402 of FIG. 19, whose frequency is equal to the frequency of the sawtooth wave form 428 of the sawtooth generator 396; and whose pulse width 404 is determined by the percentage of time that the output of the averaging and offsetting circuit 394 exceeds the voltage output of the sawtooth generator 396.

The power amplifier 400 includes a first stage power transistor 592, a second stage power transistor 594, a stage coupling resistor 596, a diode 600, and power output terminals 602 and 604.

The output voltage at the ouput terminals 602 and 604 is a pulse-width-modulated voltage whose wave form, as represented by the curve 406 of FIG. 20 is the same frequency as the curve 402 of FIG. 19, and whose pulse widths 408 are the same as the pulse widths 404 of the comparator 398; because the power amplifier follows the input signal that is provided to the transistor 592 by the comparator 398. However, the output of the power amplifier 400 has greater current capacity than the output of the comparator 398.

Connection of the output terminals 602 and 604 of the power amplifier 400 to respective ones of the terminals 298a and 298b of the force-motor 52 of FIG. 13 completes the circuitry.

Referring again to FIG. 21 and the mode switch 440, when the contact actuator 462 is positioned to move the contactor 458 against the terminal 450, the mode switch 440 is in the automatic-control mode. In this position, the ground-speed sensor 380 is connected to the input clipper and squaring amplifier 390.

Also, when the mode switch 440 is in the automatic-control mode, the contact actuator 462 moves the contactor 460 against the terminal 454; so that the source of electrical power 378 of FIG. 13 is connected to the voltage regulator 442 and to the power amplifier 400. In addition, the source of electrical power 378 is connected to the input clipper and squaring amplifier 390, the one-shot amplifier 392, and the averaging and offsetting circuit 394 through the voltage regulator 442.

When the mode switch is in the manual-control mode, the contactor 458 is in electrical contact with the terminal 452, and the contactor 460 is in electrical contact with the terminal 456. At this time the ground-speed sensor 380 is isolated from the electronic control 382; but the source of electrical power 378 is connected to the various components of the electronic control 382, as described for the automatic-control mode.

In the manual-control mode, there is no signal produced at the output terminal 526 of the amplifier 504, so the output of the averaging and offsetting circuit 394 is entirely dependent upon manual setting of the offset potentiometer 534. Therefore, the rotational speed of the reel 358 of FIG. 26 is manually adjustable by selective positioning of the arm 538 of the potentiometer 534.

In the preferred embodiment, a quad comparator, which is sold under the number LM339 by the National Semiconductor Corporation of Santa Clara, Calif., is preferred for the components that are shown and described as operational amplifiers 476, 504, 550, and 580.

Figure 22:
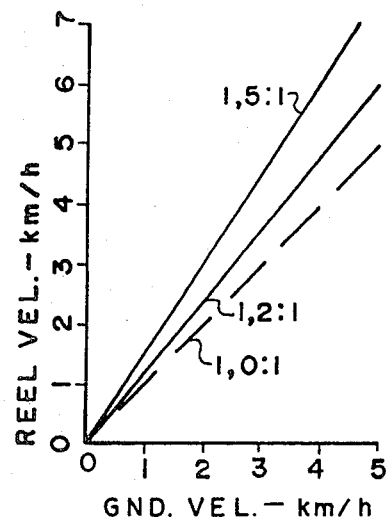
FIG. 22 is a graph of reel velocity versus ground velocity of the prior art wherein there is a fixed ratio between the reel velocity and the ground velocity.

Referring now to FIGS. 22–25, the graph of FIG. 22 illustrates the prior art wherein the reel velocity was selectable to one of two fixed ratios. The performance of this prior art design will be compared to the ideal of the present invention in which the reel velocity is always greater than the ground velocity by 0.5 kilometers per hour.

At low ground speeds, such as 0.5 kilometers per hour, such as often are used in harvesting rice, the 1.5:1 ratio provides a reel velocity that is greater than the ground speed by only 0.25 kilometers per hour.

At high ground speeds, such as 5.0 kilometers per hour, such as are used in harvesting wheat on semiarid and nonirrigated land, the 1.2:1 ratio provides a reel velocity that is greater than the ground speed by 1.0 kilometers per hour.

Therefore, even by stopping to change a drive chain from one sprocket to another, which is highly impractical for modern high-production harvesting, this prior art does not give ideal reel velocities for all ground speeds.

Figure 23:
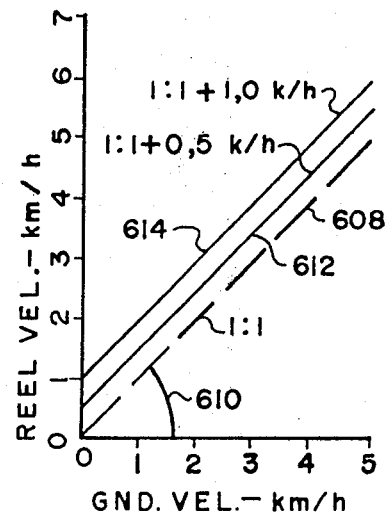
FIG. 23 is a graph of reel velocity versus ground velocity for the present invention wherein the reel velocity is greater than the ground velocity by a predetermined value.

Referring now to FIGS. 21 and 23, the arm 514 of the potentiometer 510 is adjusted by the manufacturer to provide a reel drive velocity that would be equal to the ground speed, as indicated by a curve 608, if it were not for the offset potentiometer 534. That is, a slope 610 of the curve 608 is changed by manual adjustment of the potentiometer 510 even as the slope 422 of the curve 420 of FIG. 17 is changed by manual adjustment of the potentiometer 510.

The arm 538 of the offset potentiometer 534 is adjusted by the operator of the harvesting machines to provide a desired velocity differential, between the reel velocity and the ground speed, as indicated by a curve 612, that is substantially constant irrespective of changes in ground speed.

Figure 24:
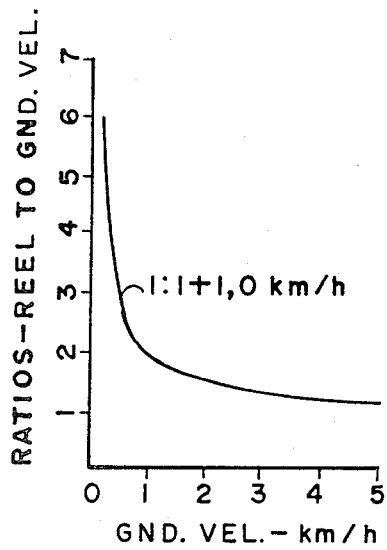
FIG. 24 is a graph of the ratio of reel velocity to ground velocity versus ground velocity for the present invention showing that the ratio of reel velocity to ground velocity decreases as ground velocity increases.

Referring now to FIG. 24, if ratios of reel velocity to ground speed are plotted against ground speed, for a curve 614 of FIG. 23, at a ground speed of 0.5 kilometers per hour, the ratio of reel velocity to ground speed is 3.0; whereas at a ground speed of 5.0 kilometers per hour, the ratio of reel velocity to ground speed is 1.2.

Therefore, the present invention is not only characterized by providing a reel speed that is greater than the ground speed by a predetermined and substantially constant velocity; but also, it is characterized by providing ratios of reel speed to ground speed that decrease with an increase in ground speed from a minimum working speed to an intermediate working speed.

Figure 25:
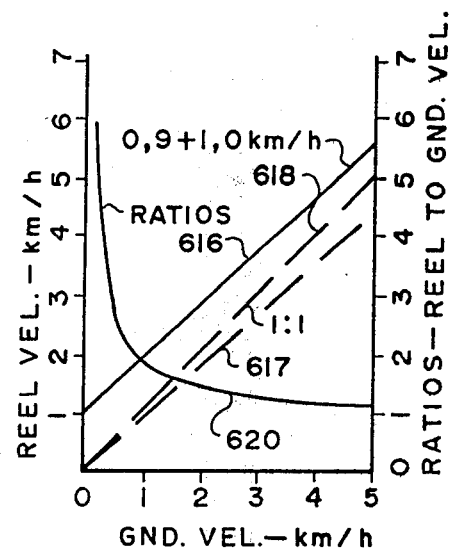
FIG. 25 is a graph of reel velocity versus ground velocity, and also is a graph of the ratio of reel velocity to ground velocity versus ground velocity, for a variation in ratios of the present invention.

Referring now to FIGS. 21, 23, and 25, ideally, the arm 514 of the potentiometer 510 is adjusted to give a 1:1 ratio of reel velocity to ground speed as shown by the curve 608 of FIG. 23. However, any ratio between 0.9 and 1.1 is considered to be within acceptable tolerance limits; so that a curve 616 of FIG. 25 is considered to indicate a reel speed that is greater than the ground speed of a curve 618 by a substantially constant velocity irrespective of ground speed.

Referring finally to FIGS. 21 and 25, even for a setting of the arm 514 of FIG. 21 that would result in a ratio of reel velocity to ground speed of 0.9 as shown by a curve 617 of FIG. 25, the addition of a basic-flow voltage by adjustment of the arm 538 of the potentiometer 534 of FIG. 21, and the resultant increase in reel velocity by 1.0 kilometers per hour, results in a reel velocity that is greater than the ground velocity for all ground velocities from zero to a maximum harvesting speed, as shown by the curve 616 of FIG. 16, and results in decreasing ratios of reel velocity to ground speed with increases in ground velocity, from zero ground speed to maximum harvesting speed, as indicated by a curve 620.

In summary, the present invention provides an electrohydraulic control, comprising the electrohydraulic valve 36 of FIG. 1 and the electronic control 382 of FIG. 21, whose rate of fluid flow is directly and linearly proportional to an input signal applied to the electronic control.

This linearity of fluid flow to input signal is achieved by the constant differential pressure across the flow path 240 of FIG. 7, linearity of the conductance of the flow path 240 versus movement of the valve spool 54, and linearity of the flow forces that are developed by fluid flow through the flow path 240, all as previously described.

Accuracy of this linear relationship between input signal and output flow is highly dependent upon the preventing of silting and sticking of the valve spools 54 and 56, and especially the valve spool 54.

The use of the pulse-width-modulated driving voltage provides a dither to the valve spool 54; and the dither of the valve spool 54 provides an oscillation in the substantially constant pressure differential across the flow path 240 of FIG. 7, so that the valve spool 56 also dithers. Thus, it is the average pressure differential that is substantially constant; and the pressure magnitude oscillates around this average pressure differential.

The amplitude of the dither of the valve spool 54 is controlled by the orifice 232; and the dither of the valve spool 56 is controlled by the orifice hole 262.

This dithering of the valve spools 54 and 56 is effective to prevent spool silting, spool sticking, and hysteresis errors; so that the output flow is linear to the input signal for both increasing and decreasing input signals; even though a flow of 82 liters per second is controlled by a valve spool that is moved only 1.5 millimeters by a force that varies over a range of only 20.5 Newtons.

The electronic control 382 includes an offsetting circuit 622 which includes the potentiometer 534 and the resistor 540, and connection of the potentiometer 534 and the resistor 540 in series between the voltage regulator 442 and the ground 548. The offsetting circuit 622 provides an offset signal 624 of FIG. 17 that results in the pulse widths 408 of the curve 406 being increased by an effective offset voltage. The resistor 540 determines the minimum value of the offset signal 624 which preferably is 2.5 volts or any other value less than the offset voltage of 3.7 volts. The only purpose for the resistor 540, which is optional, is to optimize the resolution of the potentiometer 534, setting a minimum offset signal that is only slightly under the offset voltage of the electrohydraulic valve 36.

Further, since the valve spool 54 is movable to the maximum-overlap position of FIG. 1, by a force of the spring 129 that decreases as the valve spool 54 moves from the zero-conductance position of FIG. 2 to the maximum-overlap position of FIG. 1, it is obvious that, for effective driving voltages that are somewhat below the null voltage, the pulse-width-modulated voltage will dither the valve spool 54.

Therefore, referring again to FIG. 9, if the minimum offset voltage is maintained anywhere between 1.5 and 3.7 volts, the pulse-width-modulated driving voltage will cause the valve spool 54 to dither, and both silting and sticking will be prevented during times when no flow is required.

However, if the offset voltage is adjusted to be greater than 3.7 volts, then the output of the electrohydraulic control will be greater than proportionality to the input signal by a predetermined rate of fluid flow.

Previously, the position of the first valve spool 54, as shown in FIG. 2, has been described as zero overlap, zero underlap, zero conductance, and minimum conductance. However, from the preceding discussion of the dithering of the first valve spool 54, it will be apparent that these definitions for the position of the first valve spool 54 in FIG. 2 refer to the position of the first valve spool 54 when the dither is a maximum in the first direction 236 rather than to the average position of the dither.

In like manner, the null voltage is that voltage that moves the first valve spool to a position wherein the maximum amplitude of the dither, in the first direction 236, results in an instantaneous condition of zero overlap, zero underlap, zero conductance, and minimum conductance.

Therefore, one of the advantages of the present invention, that has not been described previously, is that an electrohydraulic control is provided in which a first valve spool of a first, or pilot section, dithers between zero underlap and a positive overlap when a null voltage is applied to the force-motor by the electronic control. The result is an electrohydraulic control whose output is proportional to an input signal by virtue of the null voltage of the electronic control, whose output accurately follows variations in the input signal because of elimination of silting and sticking of the first valve spool by virtue of the dithering of the first valve spool, and whose output flow with a zero input signal is substantially zero by virtue of the dithering of the first valve spool being between zero underlap and a positive overlap position.

It should be understood that the peak voltage remains constant and the width of the voltage pulses is modulated to provide the effective driving voltage. The null voltage of 3.7 volts has peaks that are approximately 13.0 volts, as determined by the voltage of the source of electrical power 378; but the force-motor 52 develops a force whose average is the same as if a constant potential of 3.7 volts were applied to the force-motor coil 296.

For purposes of understanding the appended claims, it should be understood that an electrohydraulic control may consist of a hydraulic valve 376 and a force-motor 52 of FIG. 1; or an electrohydraulic control may include the electronic control 382 of FIG. 13. However, an electrohydraulic valve includes the valve 376 and the force-motor 52 of FIG. 1 but does not include the electronic control 382 of FIG. 21.

The input clipper and squaring amplifier 390 includes input clipper means 630 and squaring amplifier means 632. The input clipper means 630 includes the diodes 482 and 484; and the squaring amplifier means 632 includes the operational amplifier 476. The squaring amplifier means 632 produces the first square wave signal 414 of FIG. 15 having pulsed durations 634.

The input clipper and squaring amplifier 390 and the one-shot amplifier 392 cooperate to provide signal conditioning means 626 of FIG. 21 and to produce the curve or second square wave signal 416 of FIG. 16 having pulsed durations 418 which are independent of the pulsed durations 634 of the first square wave signal 414 of the input clipper and squaring amplifier 390 and which are selectively adjustable by means of the ratio-adjusting potentiometer 510.

The sawtooth generator 396 and the comparator 398 cooperate to provide pulse-width-modulation converter means 628 that converts the output of the averaging and offsetting circuit 394 into the curve or pulse-width-modulated control signal 402 which has the pulse widths 404 and which is shown in FIG. 19.

The ground-speed sensor 380 produces the curve or sinusoidal input signal 410 of FIG. 14 whose voltage and frequency are proportional to ground speeds of the harvesting machine 350; the signal conditioning means 626 produces the second square wave signal 416 of FIG. 16 whose frequency is proportional to the input signal 410 and whose pulsed durations 418 are selectively adjustable by the potentiometer 510; the averaging and offsetting means 394 produces a curve or D.C. output signal 420 of FIG. 17 that is directly proportional to both the frequency and the pulsed durations 418 of the second square wave signal 416 and increases the D.C. output signal 420 above proportionality by a predetermined offset signal 624 to a curve or increased D.C. output signal 426; the pulse-width-modulation converter means 628 produces a curve or pulse-width-modulated control signal 402 whose pulse widths 404 are proportional to the increased D.C. output signal 426; and the power amplifier 400 produces a curve or effective driving voltage 406 that comprises a pulse-width driving voltage having a frequency that is equal to the frequency of the sawtooth generator 396 and having pulse widths 408 that are proportional to the increased D.C. output signal 426.

While there have been described above the principles of the present invention in connection with specific apparatus, and while numbers have been inserted into the appended claims in parentheses in connection with elements recited therein, it is to be clearly understood that both the description and the parenthetically included numbers are made only by way of example; and the scope of the invention is to be defined by the appended claims without limitation by the parenthetical numbers included therein.

INDUSTRIAL APPLICABILITY

The apparatus of the present invention provides new, unique, and useful advantages over prior art apparatus for electrohydraulic control of fluid flow by achieving precise linear control of fluid flow versus an electrical input signal. This preciseness of output to input effectively eliminates the use of feedback systems and therefore greatly reduces the cost of providing precise electrohydraulic control.

When the apparatus of the present invention is used to control the reel speed of an agricultural harvesting machine, operator adjustment of a potentiometer is effective to set a basic-flow voltage. The basic-flow voltage is effective to increase the velocity of the reel, above proportionality to ground speed, by a predetermined and substantially constant value.

What is claimed is:

1. In an agricultural harvesting machine (350) of the type that operates between minimum and maximum ground speeds, that includes a crop-transporting mechanism (358), and that includes means for driving said crop-transporting mechanism at variable crop-transporting velocities, the improvement in which said driving means comprises:

a source of pressurized fluid (374);
   a fluid motor (38) having a rotary output shaft (370) that is operatively connected to said crop-transporting mechanism;
   electrohydraulic valve means (36), comprising a hydraulic valve (376) that is connected to said source of pressurized fluid and to said fluid motor, and comprising an electrical force-motor (52) that is operatively connected to said hydraulic valve and that includes force-motor coil means (296) for energizing said force-motor, for supplying pressurized fluid from said source of pressurized fluid to said fluid motor;
   a source of electrical power (378);
   ground-speed sensor means (380) for producing an electrical input signal that is a function of said ground speeds; and
   electronic control means (382), being connected to said ground-speed sensor means, to said source of electrical power, and to said force-motor coil means, for applying an effective driving voltage to said force-motor coil means that is a function of said input signal, and for cooperating with said electrohydraulic valve means to supply pressurized fluid from said source to said fluid motor at fluid flow rates that drive said crop-transporting mechanism at crop-transporting velocities which are greater than said ground speeds for all ground speeds from zero to a maximum harvesting speed, and at ratios of crop-transporting velocity to ground speed which decrease as said ground speed increases from zero to said maximum harvesting speed.

2. In an agricultural harvesting machine (350) of the type that operates between minimum and maximum ground speeds for harvesting operations, that includes a crop-transporting mechanism (358), and that includes means for driving said crop-transporting mechanism at variable crop-transporting velocities, the improvement in which said driving means comprises:

a source of pressurized fluid (374);
   fluid motor means (38), having a rotary output shaft (370) that is operatively connected to said crop-transporting mechanism, for driving said rotary output shaft at rotating speeds that are proportional to the fluid flow rate of pressurized fluid supplied to said fluid motor means;
   electrohydraulic valve means (36), comprising a hydraulic valve (376) that is connected to said source of pressurized fluid and to said fluid motor means, and comprising an electrical force-motor (52) that is operatively connected to said hydraulic valve and that includes force-motor coil means (296) for energizing said force-motor, for supplying pressurized fluid from said source of pressurized fluid to said fluid motor means at fluid flow rates that are a function of an effective driving voltage applied to said force-motor coil means;
a source of electrical power (378);
ground-speed sensor means (380) for producing an input signal that is proportional to said ground speeds;
electronic control means (382), being connected to said ground-speed sensor means, to said source of electrical power, and to said force-motor coil means, for applying an effective driving voltage to said force-motor coil means that is a function of said input signal, and for cooperating with said electro-hydraulic valve means to supply pressurized fluid from said source to said fluid motor means at fluid flow rates that drive said crop-transporting mechanism at crop-transporting velocities that are greater than said minimum ground speed by a predetermined and substantially constant velocity and that increase at ratios of increased crop-transporting velocity to ground speed in the range of 0.9 to 1.1.

3. In an agricultural harvesting machine (350) of the type that operates between minimum and maximum ground speeds for harvesting operations, that includes a crop-transporting mechanism (358), and that includes means for driving said crop-transporting mechanism at variable crop-transporting velocities, the improvement in which said driving means comprises:
a source of pressurized fluid (374);
fluid motor means (38), having a rotary output shaft (370) that is operatively connected to said crop-transporting mechanism, for driving said rotary output shaft at rotating speeds that are proportional to the fluid flow rate of pressurized fluid supplied to said fluid motor means;
electrohydraulic valve means (36), comprising a hydraulic valve (376) that is connected to said source of pressurized fluid and to said fluid motor means, and comprising an electrical force-motor (52) that is operatively connected to said hydraulic valve and that includes force-motor coil means (296) for energizing said force-motor, for supplying pressurized fluid from said source of pressurized fluid to said fluid motor means at fluid flow rates that are a function of an effective driving voltage applied to said force-motor coil means;
a source of electrical power (378);
ground-speed sensor means (380) for producing an input signal that is proportional to said ground speeds;
electronic control means (382), being connected to said ground-speed sensor means, to said source of electrical power, and to said force-motor coil means, for applying an effective driving voltage to said force-motor coil means that is proportional to said input signal; and
offsetting circuit means (622), comprising a cooperating portion of said electronic control means, for increasing said effective driving voltage above said proportionality by a substantially constant effective offset voltage to driving voltages that supply pressurized fluid from said source of pressurized fluid to said fluid motor means at fluid flow rates wherein said crop-transporting velocities are greater than said ground speeds for all ground speeds between zero and said maximum ground speed.

4. In an agricultural harvesting machine (350) of the type that operates between minimum and maximum ground speeds for harvesting operations, that includes a crop-transporting mechanism (358), and that includes means for driving said crop-transporting mechanism at variable crop-transporting velocities, the improvement in which said driving means comprises:
a source of pressurized fluid (374);
fluid motor means (38), having a rotary output shaft (370) that is operatively connected to said crop-transporting mechanism, for driving said rotary output shaft at rotating speeds that are proportional to the fluid flow rate of pressurized fluid supplied to said fluid motor means;
electrohydraulic valve means (36), comprising a hydraulic valve (376) that is connected to said source of pressurized fluid and to said fluid motor means, and comprising an electrical force-motor (52) that is operatively connected to said hydraulic valve and that includes force-motor coil means (296) for energizing said force-motor, and for supplying pressurized fluid from said source of pressurized fluid to said fluid motor means at fluid flow rates that are a function of an effective driving voltage applied to said force-motor coil means;
a source of electrical power (378);
ground-speed sensor means (380) for producing an input signal with voltage and frequency that are proportional to said ground speeds;
electronic control means (382), being connected to said ground-speed sensor means, to said source of electrical power, and to said force-motor coil means, for converting said input signal into an effective driving voltage that is proportional to said input signal and that comprises a pulse-width-modulated driving voltage, and for applying said effective driving voltage to said force-motor coil means; and
offsetting circuit means (622), comprising a cooperating portion of said electronic control means, for increasing said effective driving voltage above said proportionality by a substantially constant effective offset voltage to driving voltages that supply pressurized fluid from said source of pressurized fluid to said fluid motor means at fluid flow rates wherein said crop-transporting velocities are greater than said ground speed by a substantially constant value for all round speeds between zero and said maximum ground speed.

5. In an agricultural harvesting machine (350) of the type that operates between minimum and maximum ground speeds for harvesting operations, that includes a crop-transporting mechanism (358), and that includes means for driving said crop-transporting mechanism at variable crop-transporting velocities, the improvement in which said driving means comprises:
a source of pressurized fluid (374);
fluid motor means (38), having a rotary output shaft (370) that is operatively connected to said crop-transporting mechanism, for driving said rotary output shaft at rotating speeds that are proportional to the fluid flow rate of pressurized fluid supplied to said fluid motor means;
electrohydraulic valve means (36), comprising a hydraulic valve that is connected to said source of pressurized fluid and to said fluid motor means, and comprising an electrical force-motor (52) that is operatively connected to said hydraulic valve and that includes force-motor coil means (296), for energizing said force-motor, for supplying pressurized fluid from said source of pressurized fluid to said fluid motor means at fluid flow rates that are a function of an effective driving voltage applied to said force-motor coil means;

a source of electrical power (378);

ground-speed sensor means (380) for producing an input signal (410) whose voltage and frequency are proportional to said ground speeds;

signal conditioning means (626), being connected to said ground-speed sensor means and to said source of electrical power, for converting said input signal to a square wave signal (416) whose frequency is proportional to said input signal;

averaging and offsetting means (394), being connected to said signal conditioning means and to said source of electrical power, for converting said square wave signal to a D.C. output signal (420) that is proportional to said frequency of said square wave signal and for increasing said D.C. output signal above said proportionality by a substantially constant offset signal (624) that results in pressurized fluid being supplied to said fluid motor means at fluid flow rates wherein said crop-transporting velocities are greater than said ground speeds by a substantially constant value for all ground speeds between zero and said maximum ground speed;

pulse-width-modulation converter means (628), being connected to said averaging and offsetting means and to said source of electrical power, for producing a pulse-width modulated control signal (402) with pulse widths (404) that are proportional to said increased D.C. output signal; and power amplifier means (400), being connected to said pulse-width-modulation converter means, to said source of electrical power, and to said force-motor coil means, for producing an effective driving voltage (406) that comprises a pulse-width-modulated driving voltage, and for applying said effective driving voltage to said force-motor coil means.

6. An agricultural harvesting machine (350) of the type that operates between minimum and maximum ground speeds for harvesting operations, that includes a crop-transporting mechanism (358), and that includes means for driving said crop-transporting mechanism at variable crop-transporting velocities, the improvement in which said driving means comprises:

a source of pressurized fluid (374);

fluid motor means (38), having a rotary output shaft (370) that is operatively connected to said crop-transporting mechanism, for driving said rotary output shaft at rotating speeds that are proportional to the fluid flow rate of pressurized fluid supplied to said fluid motor means;

electrohydraulic valve means (36), comprising a hydraulic valve that is connected to said source of pressurized fluid and to said fluid motor means, and comprising an electrical force-motor (52) that is operatively connected to said hydraulic valve and that includes force-motor coil means (296), for energizing said force-motor, and for supplying pressurized fluid from said source of pressurized fluid to said fluid motor means at fluid flow rates that are a function of an effective driving voltage applied to said force-motor coil means;

a source of electrical power (378);

ground-speed sensor means (380) for producing an input signal (410) with voltage and frequency that are proportional to said ground speeds;

squaring amplifier means (632), being operatively connected to said ground-speed sensor means and to said source of electrical power, for converting said input signal to a first square wave signal (414) having pulsed durations (634) and having a frequency that is proportional to said frequency of said input signal;

one-shot amplifier means (392), being operatively connected to said squaring amplifier means and to said source of electrical power, for producing a second square wave signal (416) whose frequency is proportional to said frequency of said squaring amplifier means and whose pulsed durations (418) are substantially independent of said pulsed durations of said first square wave signal;

averaging and offsetting means (394), being connected to said one-shot amplifier means and to said source of electrical power, for converting said second square wave signal to a D.C. output signal (420) that is proportional to both said frequency and said pulsed durations of said second square wave signal, and for increasing said D.C. output signal above said proportionality by a substantially constant offset signal (624) that results in pressurized fluid being supplied to said fluid motor means at fluid flow rates wherein said crop-transporting velocities are greater than said ground speeds by a substantially constant value for all ground speeds between zero and said maximum ground speed;

sawtooth means (396), being connected to said source of electrical power, for producing a sawtooth wave form (428) having a predetermined frequency;

comparator amplifier means (398), being connected to said averaging and offsetting means, and being connected to said sawtooth generator, for producing a pulse-width-modulated control signal (402) whose frequency is proportional to said frequency of said sawtooth generator means and whose pulse widths are proportional to said increased D.C. output signal (426); and power amplifier means (408), being connected to said comparator amplifier means, to said source of electrical power, and to said force-motor coil means, for producing an effective driving voltage (406) that comprises a pulse-width-modulated driving voltage, and for applying said effective driving voltage to said force-motor coil means.

7. An agricultural harvesting machine (350) as claimed in claims 3 or 4 in which said electrohydraulic valve means (36) includes resilient bias means (129) for precluding fluid flow from said source of pressurized fluid (374) to said fluid motor means (38) when said effective driving voltage is below a null voltage; and said supplying of pressurized fluid from said source of pressurized fluid to said fluid motor means as said function of said effective driving voltage comprises supplying pressurized fluid to said fluid motor means at fluid flow rates that are directly proportional and substantially linear to those portions of said effective driving voltages that are in excess of said null voltage.

8. An agricultural harvesting machine (350) as claimed in claims 3 or 4 in which said electrohydraulic valve means (36) includes resilient bias means (129) for precluding fluid flow from said source of pressurized fluid (374) to said fluid motor means (38) when said effective driving voltage is below a null voltage; and said predetermined effective offset voltage comprises a basic-flow voltage that is greater than said null voltage and that cooperates with said electrohydraulic valve to provide a basic flow from said source of pressurized fluid to said fluid motor that is substantially constant irrespective of changes in said ground speed.

9. An agricultural harvesting machine (350) as claimed in claims 3 or 4 in which said offsetting circuit means (622) includes means (538) for adjusting said effective offset voltage.

10. An agricultural harvesting machine (350) as claimed in claims 3 or 4 in which said electronic control means (382) comprises means (514) for adjusting said proportionality of said effective driving voltage to said input signal.

11. An agricultural harvesting machine (350) as claimed in claims 3 or 4 in which said electrohydraulic valve means (36) includes resilient bias means (129) for precluding fluid flow from said source of pressurized fluid (374) to said fluid motor means (38) when said effective driving voltage is below a null voltage;

said offsetting circuit means (622) includes means (538) for adjusting said effective offset voltage.

12. An agricultural harvesting machine (350) as claimed in claims 5 or 6 in which said electrohydraulic valve means (36) includes resilient bias means (129) for precluding fluid flow from said source of pressurized fluid (374) to said fluid motor means (38) when said effective driving voltage is below a null voltage; and said averaging and offsetting means (394) includes means (538) for adjusting said offset signal (624).

13. An agricultural harvesting machine (350) as claimed in claim 5 in which said signal conditioning means (626) includes means (514) for adjusting said proportionality of said D.C. output signal (420) to said input signal (410).

14. An agricultural harvesting machine (350) as claimed in claim 6 in which said one-shot amplifier means (392) includes means (514) for selectively adjusting said pulsed durations (418) of said second square wave signal (416).

15. An agricultural harvesting machine (350) as claimed in claim 6 in which said electrohydraulic valve means (36) includes resilient bias means (129) for precluding fluid flow from said source of pressurized fluid (374) to said fluid motor means (38) when said effective driving voltage is below a null voltage;

said supplying of pressurized fluid from said source of pressurized fluid to said fluid motor means as said function of said effective driving voltage comprises supplying pressurized fluid to said fluid motor means at fluid flow rates that are directly proportional and substantially linear to those portions of said effective driving voltages that are in excess of said null voltage;

said averaging and offsetting means (394) includes means (538) for manually adjusting said offset signal (624); and said one-shot amplifier means (398) includes means (514) for selectively adjusting said pulsed durations (418) of said second square wave signal (416).

16. An agricultural harvesting machine (350) as claimed in claim 5 in which said signal conditioning means (626) includes input clipper means (630), comprising a pair of Zener diodes (482 and 484) being operatively connected to said ground-speed sensor means (380), for clipping voltage spikes from said input signal; and said operative connection of said signal conditioning means to said ground-speed sensor means comprises said operative connection of said Zener diodes to said ground-speed sensor means.

17. An agricultural harvesting machine (350) as claimed in claim 5 in which said signal conditioning means (626) includes squaring-amplifier means (632), being operatively connected to said ground-speed sensor means (380) and to said source of electrical power (378), for converting said input signal (410) to a square wave signal (634) whose frequency is proportional to said frequency of said input signal; and said operative connection of said signal conditioning means to said ground-speed sensor means comprises said operative connection of said squaring-amplifier means to said ground-speed sensor means.

18. an agricultural harvesting machine (350) as claimed in claim 5 in which said signal conditioning means (622) comprises squaring-amplifier means (632), being operatively connected to said ground-speed sensor means (380) and to said source of electrical power (378), for converting said input signal (410) to a first square wave signal (414) having pulsed durations (634) and having a frequency that is proportional to said frequency of said input signal; and one-shot amplifier means (392), being operatively connected to said squaring-amplifier means and to said source of electrical power for producing a second square wave signal (416) whose frequency is proportional to said frequency of said squaring-amplifier means and whose pulsed durations (418) are substantially independent of said pulsed durations of said first square wave signal; and said operative connection of said signal conditioning means to said ground-speed sensor means comprises said operative connection of said squaring-amplifier means to said ground-speed sensor means.

19. An agricultural harvesting machine (350) as claimed in claim 5 in which said pulse-width-modulation converter means (628) comprises sawtooth generator means (396), being operatively connected to said source of electrical power, for producing a sawtooth wave form (428) having a predetermined frequency; and comparator means (398), being operatively connected to said sawtooth generator means and to said source of electrical power, for producing said pulse-width-modulated control signal (402) with a frequency proportional to said frequency of said sawtooth generator and with pulse widths (404) proportional to said increased D.C. output signal (426).

* * * * *